(12) United States Patent
Fagin et al.

(10) Patent No.: US 7,149,746 B2
(45) Date of Patent: Dec. 12, 2006

(54) METHOD FOR SCHEMA MAPPING AND DATA TRANSFORMATION

(75) Inventors: Ronald Fagin, Los Gatos, CA (US); Laura Myers Haas, San Jose, CA (US); Mauricio Antonio Hernandez-Sherrington, San Jose, CA (US); Renee J. Miller, Toronto (CA); Felix Gerhard Naumann, San Jose, CA (US); Lucian Popa, Morgan Hill, CA (US); Lingling Yan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 354 days.

(21) Appl. No.: 10/144,416

(22) Filed: May 10, 2002

(65) Prior Publication Data

US 2003/0217069 A1 Nov. 20, 2003

(51) Int. Cl.
G06F 17/30 (2006.01)
G06F 7/00 (2006.01)

(52) U.S. Cl. .................. 707/102; 707/100; 707/104.1; 707/3

(58) Field of Classification Search .................. 707/10, 707/6, 100–104.1, 200–201
See application file for complete search history.

(56) References Cited

U.S. PATENT DOCUMENTS

| 5,301,313 | A | * | 4/1994 | Terada et al. .................. 707/4 |
| 5,307,086 | A | | 4/1994 | Griffin et al. ................ 345/146 |
| 5,619,688 | A | * | 4/1997 | Bosworth et al. .............. 707/4 |
| 5,680,629 | A | | 10/1997 | Slayden et al. ............. 395/789 |
| 5,787,416 | A | | 7/1998 | Tabb et al. .................... 707/2 |
| 5,842,209 | A | | 11/1998 | Mocek et al. .................. 707/4 |
| 5,995,958 | A | | 11/1999 | Xu ................................. 707/3 |
| 5,995,973 | A | | 11/1999 | Daudenarde ................ 707/103 |
| 6,016,488 | A | * | 1/2000 | Bosworth et al. .............. 707/4 |
| 6,160,554 | A | | 12/2000 | Krause ........................ 345/348 |
| 6,253,218 | B1 | | 6/2001 | Aoki et al. .................. 707/526 |
| 6,263,342 | B1 | * | 7/2001 | Chang et al. ........... 707/103 R |
| 6,282,547 | B1 | | 8/2001 | Hirsch ........................ 707/102 |
| 6,742,001 | B1 | * | 5/2004 | Ripley ..................... 707/104.1 |
| 6,768,986 | B1 | * | 7/2004 | Cras et al. ............... 707/104.1 |
| 2001/0028363 | A1 | | 10/2001 | Nomoto et al. ............. 345/748 |

(Continued)

FOREIGN PATENT DOCUMENTS

| JP | 8095996 | 4/1996 |
| WO | WO 91/06059 | 5/1991 |

OTHER PUBLICATIONS

"Data-Driven Understanding and Refinement of Schema Mappings"—Ling Ling Yan, Renee J. Miller, Laura M. Haas & Ronal Fagin—ACM Sigmod May 21-24, 2001 (PPs: 1-12).*

(Continued)

*Primary Examiner*—Jean M. Corrielus
*Assistant Examiner*—Anh Ly
(74) *Attorney, Agent, or Firm*—Samuel A. Kassatly

(57) ABSTRACT

A computer program product is provided that uses data examples as a basis for understanding and refining declarative schema mappings. The system of the present invention identifies a set of intuitive operators for manipulating examples including establishing value correspondences, data linking, data trimming, data walking, and data chasing. These operators allow a user to follow and refine an example by walking through a data source. In addition, these operators can identify a large class of schema mappings and distinguish effectively between alternative schema mappings. With these operators, a user is able to quickly and intuitively build and refine complex data transformation queries that map one data source into another while continuously verifying that the mapping is accurate and appropriate.

19 Claims, 17 Drawing Sheets

U.S. PATENT DOCUMENTS

2002/0023097 A1* 2/2002 Ripley ..................... 707/200
2002/0026443 A1* 2/2002 Chang et al. ............ 707/104.1
2002/0107840 A1* 8/2002 Rishe ......................... 707/3

OTHER PUBLICATIONS

Yan, Ling Ling et al. "Data-Driven Understanding and Refinement of Schema Mappings," ACM Signod May 21-24, 2001.

* cited by examiner

205

SCHOOL

Children (C)

| ID | name | age | mid | fid | docid |
|---|---|---|---|---|---|
| 001 | Kyle | 2 | 201 | 202 | 701 |
| 002 | Maya | 4 | 203 | 204 | 702 |
| 003 | Eric | 5 | 205 | 206 | 703 |
| 009 | Ben | 6 | 401 | 402 | |
| 004 | Carmen | 10 | 205 | 206 | 703 |

Parents (P)

| ID | name | affiliation | salary |
|---|---|---|---|
| 201 | Anne | Safeway | 50,000 |
| 202 | Paul | IBM | 60,000 |
| 203 | Jill | Xerox | 65,000 |
| 204 | Mike | NASA | 43,000 |
| 205 | Sue | MGM | 56,000 |
| 206 | Joe | CISCO | 67,000 |
| 601 | Jacky | AMCO | |

XmasBox (X)

| give | receive |
|---|---|
| 001 | 003 |
| 002 | 004 |
| 003 | 002 |
| 004 | 006 |
| 006 | 001 |

PhoneDir (Ph)

| ID | type | number |
|---|---|---|
| 201 | Home | 201-0001 |
| 202 | Work | 202-0001 |
| 202 | Cell | 202-0002 |
| 203 | Home | 203-0001 |
| 203 | Cell | 203-0002 |
| 204 | Work | 204-0001 |
| 205 | Work | 205-0001 |
| 206 | Work | 206-0001 |
| 601 | Home | 601-0001 |
| 701 | Cell | 701-0001 |

SBPS (S)

| ID | location | time |
|---|---|---|
| 002 | 364 Spod... | MW |
| 003 | 112 Lean... | MF |
| 005 | 255 Bail... | TWF |
| 009 | 216 Main... | TWF |
| 004 | 112 Lean... | MWF |

FIG. 5

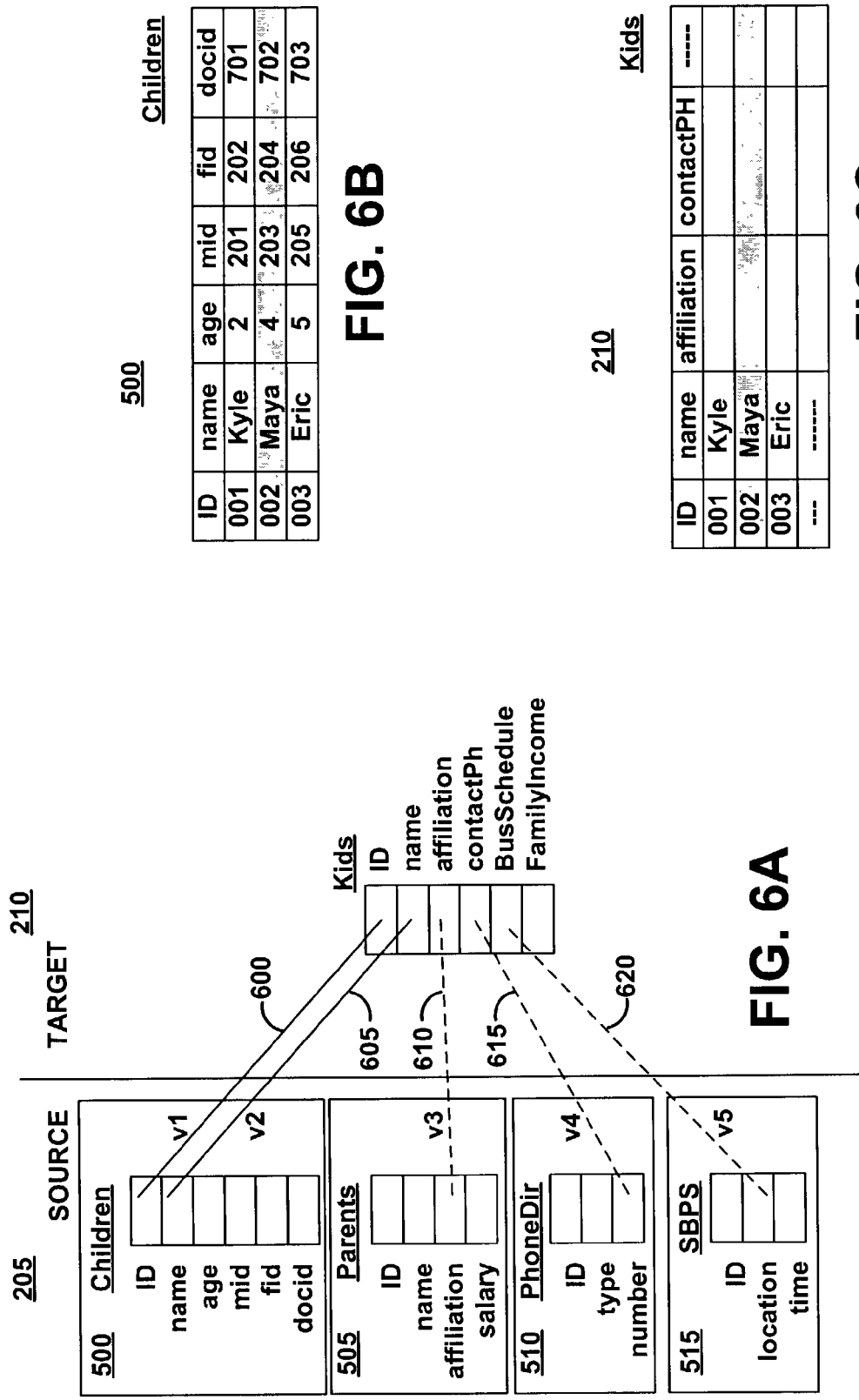

SCENARIO 1

Children 500

| ID | name | age | mid | fid | docid |
|---|---|---|---|---|---|
| 001 | Kyle | 2 | 201 | 202 | 701 |
| 002 | Maya | 4 | 203 | 204 | 702 |
| 003 | Eric | 5 | 205 | 206 | 703 |

Parents 505

| ID | name | affiliation | --- |
|---|---|---|---|
| 201 | Anne | Safeway | |
| 202 | Paul | IBM | |
| 203 | Jill | Xerox | |
| 204 | Mike | NASA | |
| 205 | Sue | MGM | |
| 206 | Joe | CISCO | |

Kids 210

| ID | name | affiliation | --- |
|---|---|---|---|
| 001 | Kyle | IBM | |
| 002 | Maya | NASA | |
| 003 | Eric | CISCO | |
| --- | | | |

SCENARIO 2

Children 500

| ID | name | age | mid | fid | docid |
|---|---|---|---|---|---|
| 001 | Kyle | 2 | 201 | 202 | 701 |
| 002 | Maya | 4 | 203 | 204 | 702 |
| 003 | Eric | 5 | 205 | 206 | 703 |

Parents 505

| ID | name | affiliation | --- |
|---|---|---|---|
| 201 | Anne | Safeway | |
| 202 | Paul | IBM | |
| 203 | Jill | Xerox | |
| 204 | Mike | NASA | |
| 205 | Sue | MGM | |
| 206 | Joe | CISCO | |

Kids 210

| ID | name | affiliation | --- |
|---|---|---|---|
| 001 | Kyle | IBM | |
| 002 | Maya | Xerox | |
| 003 | Eric | CISCO | |
| --- | | | |

FIG. 7

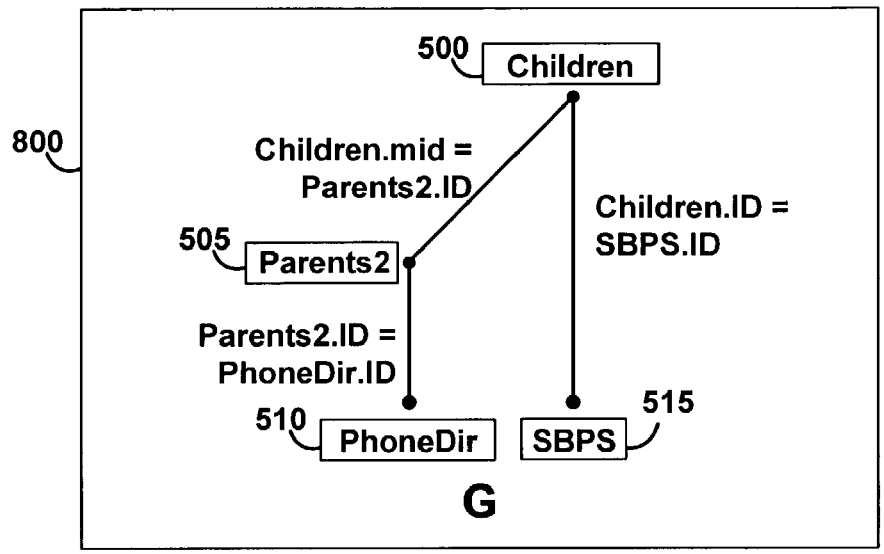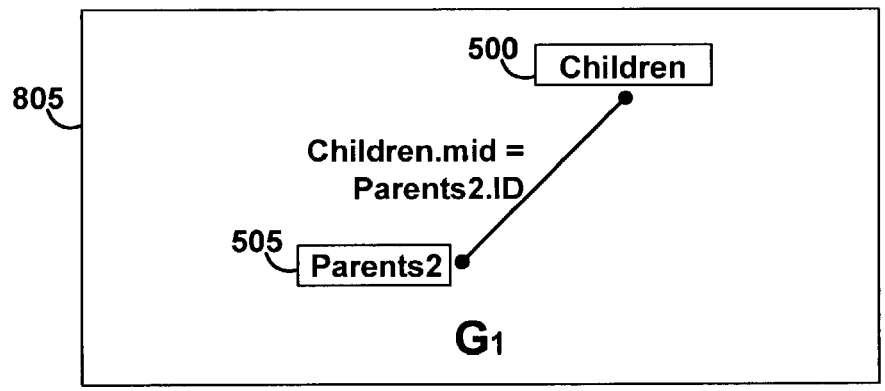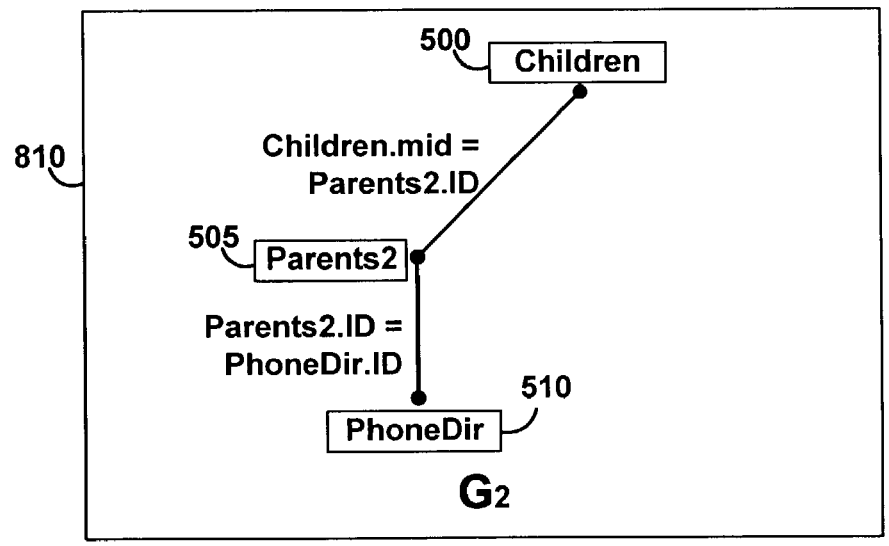
FIG. 8

| Children (500) | | | | | | Parents2 (505) | | | |
|---|---|---|---|---|---|---|---|---|---|
| ID | name | age | mid | fid | docid | ID | name | affiliation | Salary |
| 002 | Maya | 4 | 203 | 204 | 702 | 203 | Jill | Xerox | 65,000 |

905 (u):

| Children (500) | | | | | | Parents2 (505) | | | | PhoneDir (510) | | |
|---|---|---|---|---|---|---|---|---|---|---|---|---|
| ID | name | age | mid | fid | docid | ID | name | affiliation | Salary | ID | type | number |
| 002 | Maya | 4 | 203 | 204 | 702 | 203 | Jill | Xerox | 65,000 | null | null | null |

910 (v):

| Children (500) | | | | | | Parents2 (505) | | | | PhoneDir (510) | | |
|---|---|---|---|---|---|---|---|---|---|---|---|---|
| ID | name | age | mid | fid | docid | ID | name | affiliation | Salary | ID | type | number |
| 002 | Maya | 4 | 203 | 204 | 702 | 203 | Jill | Xerox | 65,000 | 203 | Home | 203-0001 |

FIG. 10

| | Cover | Children (C) (500) | | | | | Parents (P) (505) | | | | PhoneDir (Ph) (510) | | | SBPS (S) (515) | |
|---|---|---|---|---|---|---|---|---|---|---|---|---|---|---|---|
| | | ID | name | age | mid | fid | ID | name | aff'n | Salar | ID | type | number | ID | time |
| 1 | CPPhS | 002 | Maya | 4 | 203 | 204 | 203 | Jill | Xerox | 65k | 203 | Home | 203-0001 | 002 | MW |
| 2 | CPPhS | 002 | Maya | 4 | 203 | 204 | 203 | Jill | Xerox | 65k | 203 | Cell | 203-0002 | 002 | MW |
| 3 | CPPhS | 003 | Eric | 5 | 205 | 206 | 205 | Sue | MGM | 56k | 205 | Work | 205-0001 | 003 | MF |
| 4 | CPPhS | 004 | Carmen | 10 | 205 | 206 | 205 | Sue | MGM | 56k | 205 | Work | 205-0001 | 004 | MWF |
| 5 | CPPh | 001 | Kyle | 2 | 201 | 202 | 201 | Anne | Safeway | 50k | 201 | Home | 201-0001 | | |
| 6 | CS | 009 | Ben | 6 | 401 | 402 | | | | | | | | 009 | TWF |
| 7 | PPh | | | | | | 601 | Jacky | AMCO | | 601 | Home | 601-0001 | | |
| 8 | Ph | | | | | | | | | | 701 | Cell | 701-0001 | | |
| 9 | S | | | | | | | | | | | | | 005 | TWF |

205

| Coverage | Children(C) | | | Parents(P) | | PhoneDir(Ph) | | SBPS(S) | |
|---|---|---|---|---|---|---|---|---|---|
| | ID | name | age | mid | ID | affiliation | ID | number | ID | time |
| C,P,Ph(+) | 001 | Kyle | 2 | 201 | 201 | Xerox | 201 | 201-0001 | | |
| C,S(+) | 009 | Ben | 6 | 401 | | | | | 009 | TWF |
| C,P,Ph,S(+) | 002 | Maya | 4 | 203 | 203 | MGM | 203 | 203-0001 | 002 | MW |
| C,P,Ph,S(+) | 002 | Maya | 4 | 203 | 205 | Safeway | 203 | 203-0001 | 002 | MW |
| C,P,Ph,S(-) | 004 | Carmen | 10 | 205 | 205 | | 205 | 205-0001 | 004 | MWF |
| P,Ph(-) | | | | | 601 | AMCO | 601 | 601-0001 | | |
| Ph(-) | | | | | | | 701 | 701-0001 | | |
| S(-) | | | | | | | | | 005 | TWF |

FIG. 11

SCENARIO 1

210

Kids

| ID | name | affiliation | contactPH | ---- |
|---|---|---|---|---|
| 001 | Kyle | IBM | 202-0001 | |
| 001 | Kyle | IBM | 202-0002 | |
| 002 | Maya | NASA | 204-0001 | |
| 003 | Eric | CISCO | 206-0001 | |

205

Children (500)

| ID | name | age | mid | fid | docid |
|---|---|---|---|---|---|
| 001 | Kyle | 2 | 201 | 202 | 701 |
| 002 | Maya | 4 | 203 | 204 | 702 |
| 003 | Eric | 5 | 205 | 206 | 703 |

Parents (505)

| ID | name | affiliation |
|---|---|---|
| 201 | Anne | Safeway |
| 202 | Paul | IBM |
| 203 | Jill | Xerox |
| 204 | Mike | NASA |
| 205 | Sue | MGM |
| 206 | Joe | CISCO |

PhoneDir (510)

| ID | type | number |
|---|---|---|
| 201 | Home | 201-0001 |
| 202 | Work | 202-0001 |
| 202 | Cell | 202-0002 |
| 203 | Home | 203-0001 |
| 203 | Cell | 203-0002 |
| 204 | Work | 204-0001 |
| 205 | Work | 205-0001 |
| 206 | Work | 206-0001 |

FIG. 12A

SCENARIO 1 205

Children 500

| ID | name | age | mid | fid | docid |
|---|---|---|---|---|---|
| 001 | Kyle | 2 | 201 | 202 | 701 |
| 002 | Maya | 4 | 203 | 204 | 702 |
| 003 | Eric | 5 | 205 | 206 | 703 |

SBPS 515

| ID | location | time |
|---|---|---|
| 002 | 364 Spode Way | MW |
| 003 | 112 Lean Ave | MF |
| 005 | 255 Bailey Ave | TWF |

SCENARIO 2 205

Children 500

| ID | name | age | mid | fid | docid |
|---|---|---|---|---|---|
| 001 | Kyle | 2 | 201 | 202 | 701 |
| 002 | Maya | 4 | 203 | 204 | 702 |
| 003 | Eric | 5 | 205 | 206 | 703 |

XmasBox 520

| give | receive |
|---|---|
| 001 | 003 |
| 002 | 004 |
| 003 | 002 |

SCENARIO 3 205

Children 500

| ID | name | age | mid | fid | docid |
|---|---|---|---|---|---|
| 001 | Kyle | 2 | 201 | 202 | 701 |
| 002 | Maya | 4 | 203 | 204 | 702 |
| 003 | Eric | 5 | 205 | 206 | 703 |

XmasBox 520

| give | receive |
|---|---|
| 001 | 003 |
| 002 | 004 |
| 003 | 002 |

FIG. 14

METHOD FOR SCHEMA MAPPING AND DATA TRANSFORMATION

CROSS-REFERENCE TO RELATED APPLICATIONS

The present application relates to co-pending U.S. patent application Ser. No. 09/658,303, filed on Sep. 8, 2000, titled "System and Method for Schema Mapping," and Ser. No. 09/500,648, filed on Feb. 9, 2000, titled "User-Defined Relationships For Diagramming User-Defined Database Relations," both of which are assigned to the same assignee as the present application.

FIELD OF THE INVENTION

The present invention generally relates to the field of data processing, and particularly to a software system and associated method for use with possibly dissimilar databases to transfer data from at least one source database or schema to a target database or schema. The method of this invention relies on data examples to understand and refine declarative schema mappings. More specifically, this invention pertains to a visual method of mapping data from at least one source schema to a target schema in which the user incrementally creates, evolves, and composes the complex queries required for mapping large, complex, or unfamiliar data sources to a target schema while verifying that the mapping is correct.

BACKGROUND OF THE INVENTION

Database systems are collections of files stored on computers or other linked systems such as the Internet. The files together contain all the information about a topic or related topics. Generally, a file system is used to "file away" information which a user will later retrieve for processing. Normally, a file resides in directly accessible storage and can be manipulated as a unit by file system operations. A file system allows a user the means for storing data in files, accessing the data in those files, managing direct access to storage space where the files are stored, and guaranteeing the integrity of those files. Businesses and other organizations use databases to manage information about clients, orders, client accounts, etc. Businesses often need to manage and merge the data from many different sources, among which are "legacy" sources that use obsolete software or data structures.

The World Wide Web (WWW) is essentially a large database. The WWW, or Internet, is comprised of an expansive network of interconnected computers upon which businesses, governments, groups, and individuals throughout the world maintain inter-linked computer files known as web pages. The volume of data available on the Internet is increasing daily, but the ability of users to understand and transform this data has not kept pace. Businesses need the ability to capture and manipulate data available on the Internet for such applications as data warehousing, global information systems, and electronic commerce.

E-commerce and other data-intensive applications rely on the ability to capture, use, and integrate data from multiple sources. To transform data from one structure or schema to another, mappings must be created between the data source (or set of heterogeneous data sources) and a target or integrated schema. While important advances have been made in the ability to create and manage these mappings, a number of important issues remain.

First, the number of possible, reasonable mappings between a data source and a target schema can be enormous. Users are unable to conceive of all the possible alternatives and may have difficulty specifying the correct mapping for a specific application. A system is needed that considers, manages, and ranks alternate mappings while allowing the final choice of mapping by a user who understands the semantics of the target schema.

Second, schema mappings are typically complex queries. Subtle changes to the mapping such as changing an inner join to an outer join may dramatically change the target data results. In other cases, the same mapping change may have no effect due to constraints held on the source schema. A system is needed that embodies the complex query and constraint reasoning needed to understand subtleties while effectively communicating these subtleties to the user.

Third, the user performing the mapping may not fully understand the source data or schema fully. This is especially true when dealing with legacy data sources. A system is needed that facilitates both schema and data exploration. In addition, the system must leverage the parts of the data and schema that the user does understand to gain maximum advantage in forming the schema mapping.

Fourth, given the complexity of the mappings and the subtle differences between alternative mappings, even an expert user may require assistance. To select a specific mapping, the user must understand the mapping plus how the specific mapping differs from other possible mappings. A system is needed that allows the user to map portions of the source data to the target without exposing the user to tangled SQL (Structured Query Language) or complex QBE (Query By Example) queries. The system should also illustrate the effects of alternate mappings, helping the user differentiate between subtle changes.

Fifth, data merging queries require the use of complex, non-associative operators. Reasoning about such operators can be extremely difficult for both users and query management tools. Because the operators may not be associative, even managing compositions of queries can be a difficult task. However, to be scalable to large schemas, mapping tools must permit users to incrementally create, evolve, and compose such complex queries. A system is needed that develops a mapping representation and set of mapping operators permitting the incremental creation and management of large, complex mappings.

The ultimate goal of schema mapping is not to build the correct query, but to extract the correct data from the source to populate the target schema. Current data transformation (ETL—Extract, Transform, and Load) tools and query formation tools focus on building queries or transformation programs, but provide limited support in verifying that the derived data set is correct. If a query or transformation is incomplete or incorrect, there is typically no support for refining and correcting it. The user is expected to have a thorough understanding of the data source and to debug complicated SQL queries or procedural transformation programs by hand.

Systems currently exist which allow a user to map data from one schema to another, as in System and Method for Schema Mapping, ARC9-2000-0125. This system allows the user to quickly transfer data from one schema to another, but requires the user to be familiar with both the source and target schema. In addition, the user interface with the system uses a visual depiction of the database structure but not of its data content. Another system, "User-Defined Relationships For Diagramming User-Defined Database Relations" RO999-167, provides a graphical interface for the user. This interface allows the user to visualize the structure of a schema, but does not provide for transfer of data from one schema to another and does not use data to guide the user.

Some ad hoc query tools focus on helping users access data using natural language or through a point-and-click graphic user interface (GUI). These requests are processed by a meta-data layer that translates them into SQL queries. In these systems, the user does not have to know SQL, understand the schema, or know how attributes are decomposed among relations. The translation process is hard-coded using (often procedural) transformation programs. These programs are provided by an expert data administrator with complete knowledge of the data. Most of these tools are tightly integrated with a report generating facility so they can readily display the query result. However, the tools do not allow the users to verify or rectify queries by working with the displayed data. Visual query builders focus on helping users compose SQL queries faster and with fewer errors, rather than focusing on understanding the data source using data and allowing users to refine their queries using data examples.

Thus, there is need for a system that provides a graphical interface for transferring data from one complex schema to another. This system should create, manage, and rank alternative mappings. In addition, the system should provide facilities for schema and data exploration to help the user understand the source structure and data. The system should also permit users to incrementally create, evolve, and compose complex queries that are scalable to large schemas. Most importantly, the system should support the understanding and verification of the correctness of complex data-transformation queries. The need for such a system has heretofore remained unsatisfied.

SUMMARY OF THE INVENTION

The system and method of the present invention for data-driven understanding and refinement of schema mappings satisfies this need. The invention describes a system and method that presents a new data-driven framework for understanding and choosing mappings based on examples. A novel aspect of the schema mapping system is the use of data examples extracted from the source databases to help users understand the extracted, transformed data. This is in contrast to QBE-style approaches that use examples as an abstraction of the query itself.

The schema mapping system of the invention uses a powerful mapping representation that facilitates the incremental creation and management of complex mappings over large data sources. In addition, use of a mapping example eases the tasks of understanding, selecting, and refining schema mappings. The schema mapping system identifies a set of operators on mapping examples and mappings, providing formal semantics for each. These operators provide an appropriate, easy-to-use abstraction for tackling the schema-mapping problem; some of the supported activities are establishing a correspondence, data linking, data trimming, data walking, and data chasing.

The schema mapping system develops a framework for showing carefully selected examples to the user, examples that change as needed in response to changes in the mapping. The schema mapping system chooses the examples to permit a user both to understand a mapping and to understand how it differs from alternative mappings. Using examples, the user can "walk around" inside the database, manipulate the data, understand how data is organized and see how to combine pieces of data meaningfully in the context of the target schema. The user can "walk" along paths known to the system of the invention (a data walk), or actively discover new ways of connecting data (a data chase). By following the "tracks" of the user, the schema mapping system gains sufficient semantic knowledge to compose complex mapping queries.

The system of the invention allows the user to visualize schema mappings from at least one source schema to a target schema. The method of the present invention can operate on one source database at a time or process all source databases at once to obtain examples from each. Additionally, the data-driven understanding and schema mapping system of the present invention provides the following actions and benefits; the schema mapping system of the present invention:

- defines each mapping as a union of jointerms (or joint terms), each jointerm mapping different parts of the data;
- selects examples (if possible) of actual user data content such that each jointerm produces only a few examples as opposed to selecting an entire table;
- performs optimization to minimize the use of data common to multiple jointerms when selecting examples;
- uses sample databases to increase efficiency in finding examples;
- presents examples and possible alternative mappings to the user in a graphical user interface so the user can modify the mapping until satisfied;
- shows examples of what data will be included in the target schema (positive examples) and what data will not be included in the target schema (negative examples);
- shows the number of tuples each jointerm represents;
- generates SQL corresponding to mappings;
- allows data exploration in the form of a "data walk";
- allows identification in the form of a "data chase" of domain values occurring elsewhere in the databases; and
- enables the user to evolve complex queries defining the mapping while continuously verifying that the current mapping is appropriate.

These benefits are particularly useful when the relationships between the source schema and the target schema are complex, the source and target databases are large, and/or the schema and data is unfamiliar to the user.

The system of the invention derives the SQL needed to map from multiple source rows in multiple source tables to a combined row in the target table, so the user does not have to create any SQL code. The system of the invention shows carefully selected example rows that would be mapped or excluded by the mapping so the user can view the actual data to determine if the mapping is appropriate. In addition, the system of the invention displays examples of how the source data is mapped to the target database. These examples may be unfinished mappings or alternate mappings. Mappings can be positive (data that will be moved to the target) or negative (data that will not be moved to the target). One novel feature of the system of the invention is the emphasis on placing data in the target properly, as opposed to formulating queries and SQL.

There may be a tremendous number of potential mappings from the source to the target databases. In addition, the user may not fully understand the source data or schema. Another novel feature of the system of the invention is the ability to explore the source schema and data through data walks and data chases. The system of the invention allows users to incrementally create, evolve, and compose complex queries while allowing the user to verify that a desired data set is correct.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

FIG. 5 is an exemplary source database;

FIG. 6 is comprised of FIGS. 6A, 6B, and 6C, and illustrates a schema-mapping example based on the exemplary source database of FIG. 5;

FIG. 7 shows two possible scenarios for associating the parents and children of the exemplary source database of FIG. 5;

FIG. 8 displays the query subgraphs for the relations of the exemplary source database of FIG. 5;

FIG. 9 shows examples of full and possible data associations based on the query graphs of FIG. 8;

FIG. 10 displays data associations based on query graph G of FIG. 8;

FIG. 11 illustrates the data associations for a sufficient illustration based on the exemplary source database of FIG. 5;

FIG. 14 shows three possible scenarios generated by the system of the present invention as it chases data values through the schema of the exemplary source database of FIG. 5;

DETAILED DESCRIPTION OF PREFERRED EMBODIMENTS

The following definitions and explanations provide background information pertaining to the technical field of the present invention, and are intended to facilitate the understanding of the present invention without limiting its scope:

GUI: Graphical User Interface, a program interface that takes advantage of the computer's graphics capabilities to make the program easier to use.

Join: In relational databases, a join operation matches records in two tables. The two tables must be joined by at least one common field, i.e. the join field is a member of both tables. Typically, a join operation is part of a SQL query Inner Join: the default join, producing a resulting record if a matching condition evaluates to true.

Outer Join: creates the same record whether or not the matching condition is met.

Internet: A collection of interconnected public and private computer networks that are linked together with routers by a set of standard protocols to form a global, distributed network.

Metadata: Data about data; for example, tags that indicate the subject of a WWW document. Metadata describes how or when or by whom a particular set of data was collected, and how the data is formatted. Metadata is essential for understanding information stored in data warehouses.

Record/Tuple: In database management systems, a set of information. Records are composed of fields, each of which contains one item of information. A set of records constitutes a file. For example, a personnel file might contain records that have three fields: a name field, an address field, and a phone number field. A record corresponds to a row in a table.

QBE: Query By Example, a method of forming queries in database management systems in which the database program displays a blank record with a space for each field. The user then enters conditions for each field included in the query.

Schema: Format or structure. It defines the structure and type of contents of constituent structures of, for example, a relational database, XML documents, etc.

SQL: Structured Query Language, a standardized query language for requesting information from a database.

Figure 1:
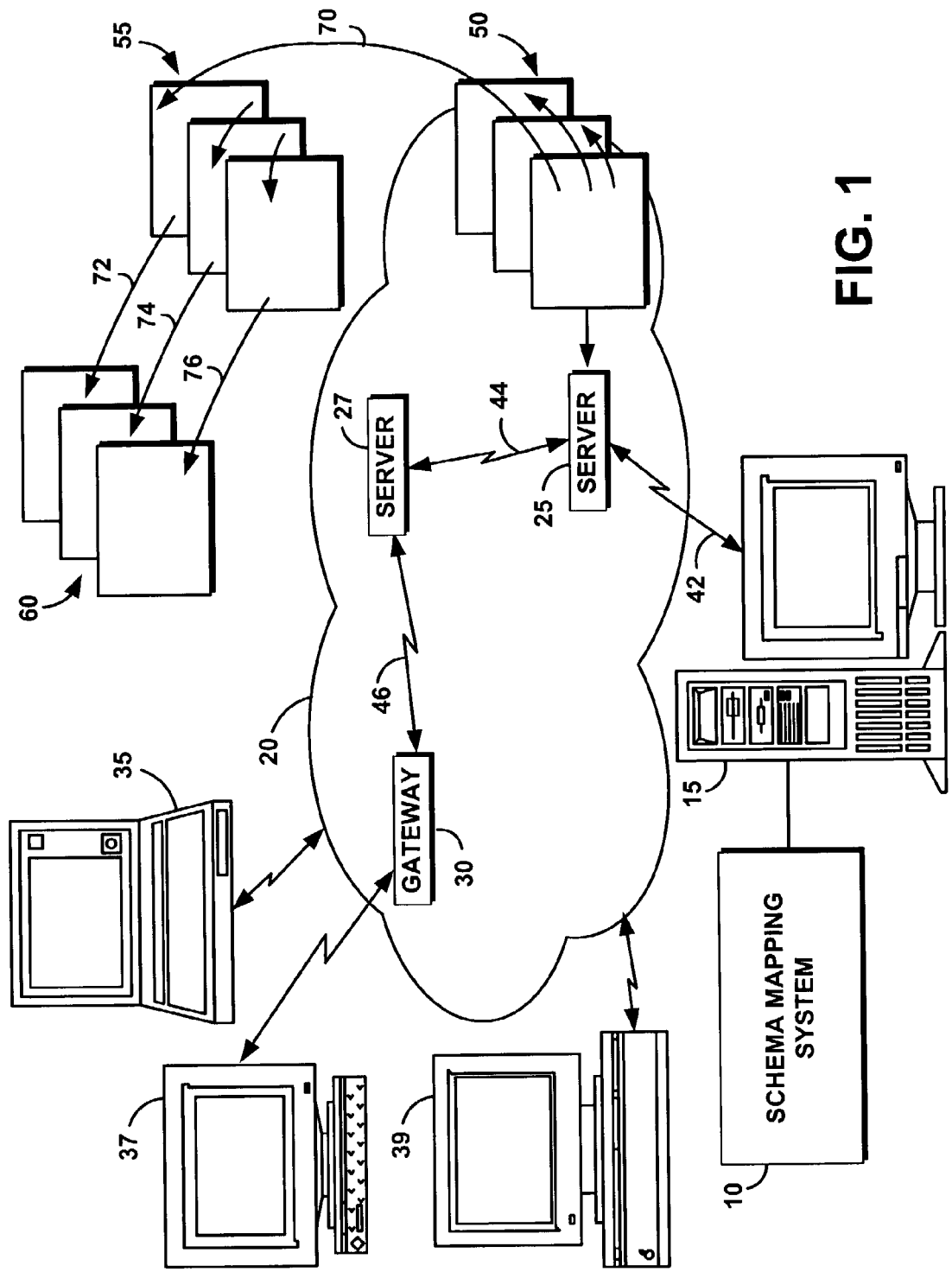
FIG. 1 is a schematic illustration of an exemplary operating environment in which a data-driven understanding and refinement of schema mapping system of the present invention can be used.

FIG. 1 portrays the overall environment in which a data-driven-understanding-and-refinement-of-schema-mapping system 10 according to the present invention may be used. The system 10 includes software or a computer program that is typically embedded within or installed on a host server 15. Alternatively, the system 10 can be saved on a suitable storage medium such as a diskette, a CD, a hard drive, or like devices. While the system 10 will be described in connection with the WWW, the system 10 can be used with a stand-alone database of documents or other text sources that may have been derived from the WWW and/or other sources.

The cloud-like communication network 20 is comprised of communication lines and switches connecting servers such as servers 25, 27, to gateways such as gateway 30. The servers 25, 27 and the gateway 30 provide the communication access to the WWW Internet. Users, such as remote Internet users are represented by a variety of computers such as computers 35, 37, 39, and can query the host server 15 for the desired information.

The host server 15 is connected to the network 20 via a communication link such as a telephone, cable, or satellite link. The servers 25, 27 can be connected via high speed Internet network lines 44, 46 to other computers and gateways. The servers 25, 27 provide access to stored information such as hypertext or web documents indicated generally at 50, 55, and 60. The hypertext documents 50, 55, 60 most likely include embedded hypertext link to other locally stored pages, and hypertext links 70, 72, 74, 76 to other webs sites or documents 55, 60 that are stored by various web servers such as the server 27.

Figure 2:
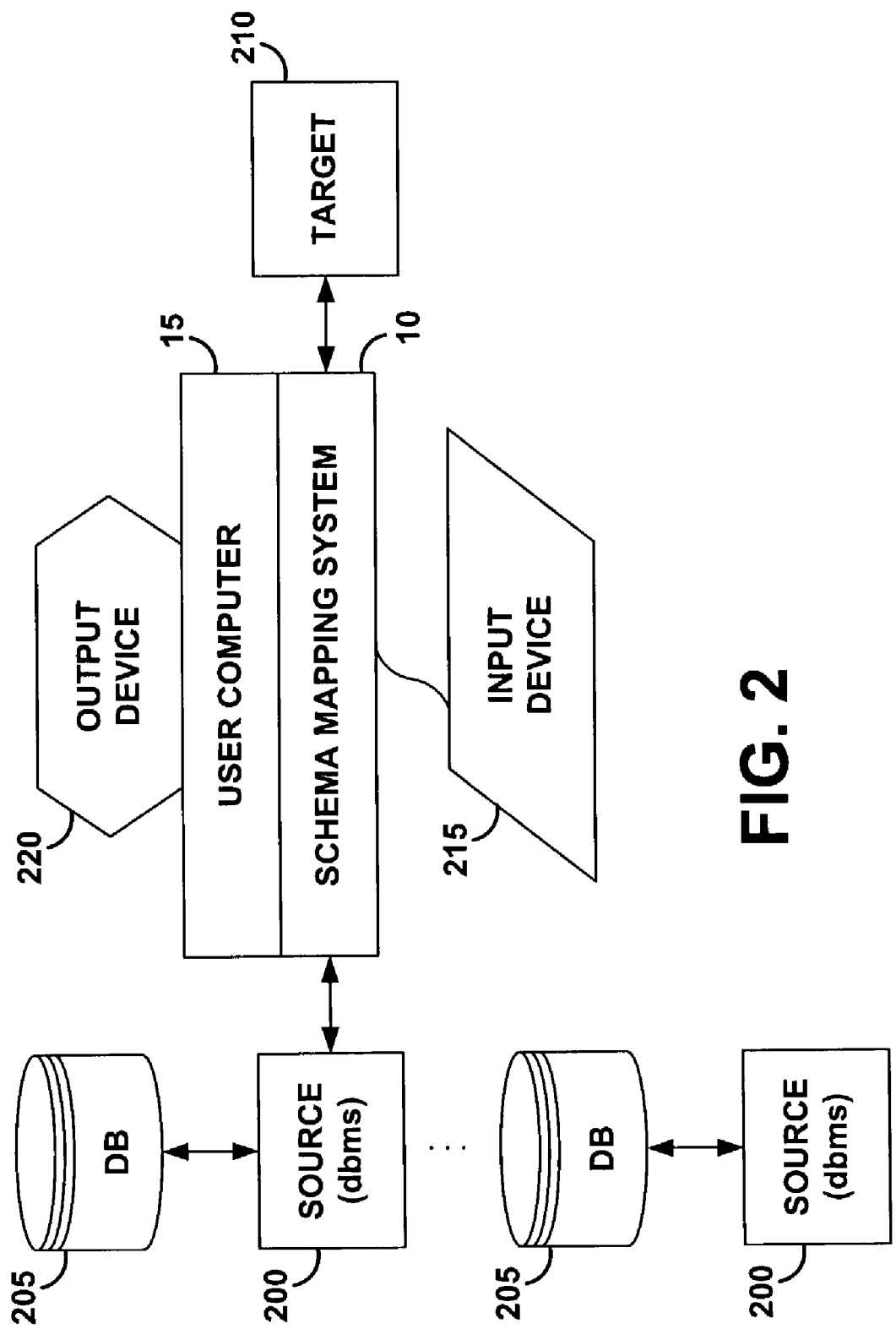
FIG. 2 illustrates the high-level architecture for the data-driven understanding and refinement of schema mapping system of FIG. 1.

FIG. 2 illustrates the high-level architecture showing the schema mapping system 10 used in the context of an Internet or Intranet environment. A data source such as an data base management system (dbms) 200 with associated database 205 stores data in a source schema while the data target 210 stores data in the target schema. The database 205 may reside in a Web server or other location remote from the user computer 15 and may be accessible via a wide area network such as, but not limited to, an Internet.

As shown in FIG. 2, the computer 15 is electrically or optically connected to one or more input devices 215 such as a mouse or keyboard which are manipulated by the user to interact with the schema mapping system 10. The results of the system 10 execution can be output via an output device 220 such as a printer or monitor that are connected to the user computer 15.

The logic framework used by the schema mapping system 10 includes mappings and examples. Mapping is defined as a query on the source schema 205 that produces a subset of a target 210 relation. Generally, portions of a target 210 relation are computed by separate queries. The results of these queries are then combined to form the final content of the target 210 relation. Thus, a mapping defines one out of possibly many ways of forming target 210 tuples. Examples demonstrate either how a set of source 205 tuples combine together to contribute toward the target 210 relation, or how source 205 tuples are combined together correctly but fail to make it into the target 210.

Mapping construction includes three activities. The first activity, determining correspondences, determines where and how source data values 205 should appear in the target schema 210 and how the system 10 combines or transforms source 205 values to make up target 210 values. The second activity, data linking, determines how source 205 tuples from different relations should be combined to form a target 210 tuple plus the conditions used to join source 205 relations. The third activity, data trimming, determines which of the joined source 205 tuples should be used in forming a target 210 tuple.

Design of the schema mapping system is based on the following formal notion of mapping that represents the decisions made in each of the three mapping activities. Let A be a set of attributes, where for each $A \in \mathbb{A}$ there is an associated domain dom(A) of values. A scheme S is a finite set of attributes. A tuple t on S is an assignment of values to the attributes of S. For an attribute $A \in S$, $t[A] \in \text{dom}(A)$ denotes the value of t on A.

A tuple may be denoted using a set of attribute-value pairs:

$$t = \{A_1:v_1, A_2:v_2, \ldots\}. \quad (1)$$

A relation on scheme S is a named, finite set of tuples on S. When confusion will not arise, the system 10 uses the same symbol for both a relation and its name. A database is a set of relations over mutually disjoint schemes where the database schema is the corresponding set of relation names. The common assumption is that the relations in the source database 205 do not contain any tuples null on all attributes because it is unclear how such a tuple should be should be reflected in a schema mapping. A predicate P over a scheme S maps tuples on S to true or false. A predicate is strong if it evaluates to false on every tuple that is null for all attributes in S. A join predicate is a strong predicate over attributes in two relations. Note that join predicates in SQL are strong. A selection predicate is a predicate over attributes in one relation. The system 10 does not require selection predicates to be strong. Mappings may require multiple copies of a relation. System 10 assumes that if multiple copies of a relation are required, each copy and its attributes have been given unique names that in turn may be used unambiguously in predicates.

To construct a mapping, the system 10 uses value correspondences to know where data should appear in the target 210, i.e., in what attribute and manner the data should appear. A value correspondence is a function defining how a value or set of values from a source database 205 can be used to form a value in a target 210 relation such that v is a function over the values of a set of source 205 attributes $A^1, \ldots, A^k$ that computes a value for target 210 attribute B.

$$v: \text{dom}(A^1) \times \ldots \times \text{dom}(A^k) \rightarrow \text{dom}(B) \cup \{\text{null}\} \quad (2)$$

Note that value correspondences are simply functions on attribute values. They do not indicate which values will be included in the mapping nor how different values will be associated.

Data linking uses query graphs to represent the linkage among source 205 tuples, that is, how the system 10 combines source 205 tuples correctly in the context of a target 210 relation. A query graph G=(N, E) over a database schema S is an undirected, connected graph where N is a subset of the relation names in S. Each edge $$e = (n_1, n_2) \in E \quad (3)$$

is labeled by a conjunction of join predicates on attributes in the union of the schemes of $n_1$ and $n_2$. A query graph thus defines a way of associating tuples from different source 205 relations. The nodes of a query graph are source 205 relation names. The edges represent join predicates between pairs of source 205 relations.

Before defining the scope of a mapping, i.e., which source 205 tuples are to be included in the mapping, the system 10 must consider possible interpretations of a query graph. Clearly, one interpretation is as a join query. However, to support the data merging semantics of mappings, the system 10 may also need to interpret a query graph as an outer join query or as a combination of joins and outer joins. The system 10 refers to the set of all possible tuple associations that conform to a query graph as its data associations. The data associations for system 10 fall into three categories: full data associations, possible data associations, and data associations.

The set of full data associations of the query graph G is defined as $$F(G) = \sigma_p(R_1 \times \ldots \times R_n) \quad (4)$$

where G(N, E) is the query graph and P is the conjunction of all edge predicates in G Given a query graph G, the full data associations of G can be computed by an inner join query, based on G. Note that the join need not be lossless; there may be tuples from the source 205 relations that do not contribute to any full data association. A full data association is "full" because it involves tuples from all nodes of G. In defining mappings, the system 10 may also consider non-full associations. For each induced, connected subgraph $J=(J_J, E_J)$ of the query graph G, if d is a full data association of J, then d padded with nulls on all attributes in $N-N_J$ is a possible data association of G. The coverage of d is $N_J$, denoted as coverage(d)=$N_J$.

Generally, non-full data associations may be important to include in a mapping if there is no full data association that includes more information, as is represented by subsumption. A tuple $t_1$ subsumes a tuple $t_2$ if $t_1$ and $t_2$ have the same scheme and $t_1[A]=t_2[A]$ for all attributes A where $t_2[A] \neq \text{null}$. Moreover, $t_1$ strictly subsumes $t_2$ if $t_1 \neq t_2$; a strictly subsumed tuple is "redundant" since it repeats information that is already represented by another tuple. The minimum union operator removes such redundancies where the minimum union of two relations $R_1$ and $R_2$, denoted $R_1 \oplus R_2$, is the outer union of $R_1$ and $R_2$ with strictly subsumed tuples removed. The outer union is the union of $R_1$ (padded with nulls on attributes that are in $R_2$ but not in $R_1$) and $R_2$ (padded with nulls on all attributes that are in $R_1$ but not in $R_2$).

The set of all data associations of the query graph G is defined as D(G):

$$D(G)=S(G)-U(G) \quad (5)$$

where S(G) is all the possible data associations of G and U(G) is the set of tuples in S(G) that are strictly subsumed by another tuple in S(G). A data association is therefore a tuple in D(G), which can be computed by combining full data associations over all induced and connected subgraphs of G, using minimum union. That is, if $J_1, \ldots, J_\omega$ are all the induced and connected subgraphs of G, then $$D(G)=F(J_1) \oplus \ldots \oplus F(J_\omega). \quad (6)$$

D(G) is the full disjunction of query graph G. The full disjunction provides natural semantics for data merging queries.

Once a query graph G is established, the system 10 preserves all possible linkages among source 205 tuples by computing D(G). However, not all tuples of D(G) may be semantically meaningful in the context of the target 210 relation. The schema mapping system uses data trimming to specify which data associations match the semantics of the target 210 relation.

For any induced subgraphs $J_1$, $J_2$ of G, $$D(G, J_1) \cap D(G, J_2) = \emptyset \text{ if } J_1 \neq J_2 \quad (7)$$

where system 10 assumes that no source 205 tuples are null on all attributes, $J=(N_J, E_J)$ is an induced connected subgraph of G, and D(G,J) is the set of data associations in D(G) whose coverage is $N_J$. D(G) can be partitioned into $\omega$ subsets, $D(G, J_1), \ldots, D(G, J_\omega)$, if $J_1, \ldots, J_\omega$ are all the induced connected subgraphs of G. Each $D(G, J_i)$ is a category of D(G). Data associations in some of these categories may be too incomplete to include in the mapping. Generally, a user may determine that some categories D(G) (i.e., specific $D(G, J_i)$) must be excluded from the mapping because they have incomplete coverage.

Alternatively, a user may wish to exclude data associations that satisfy some selection predicate or other criteria. The user may determine that some data associations must be excluded from the mapping because they have invalid values, i.e., the associations fail to satisfy certain conditions on the values they contain. System 10 allows exclusion of both incomplete and invalid values by using filters.

As described above, the three activities involved in mapping construction are creating correspondences, data linking, and data trimming. System 10 supports the activity of creating value correspondences, the activity of data linking, and the activity of data trimming. System 10 uses these three activities to build a representation of a mapping.

A mapping from N to T is a four-tuple }G, V, $C_S$, $C_T$¬ where:

G is a connected query graph with node set N;
$V=\{v_1, \ldots, v_m\}$ is a set of value correspondences where each $v_i: dom(A_1^i) \times \ldots \times dom(A_{kj}) \rightarrow dom(B_i) \cup \{null\};$ $C_S=\{p_1^s, \ldots, p_x^s\}$ is a set of selection predicates over source 205 relations in N; and $C_T=\{p_1^t, \ldots, p_y^t\}$ is a set of selection predicates over the target 210 relation T based on the assumptions that $N=\{R_1, \ldots, R_n\}$ is a set of source 205 relation names and $T(B_1, \ldots, B_m)$ is a target 210 relation name. The mapping query defined by M is the following:

```
select     *
from       (   select      v₁(A₁¹, ..., A_{k₁}¹) as B₁, ...,
                           v_m(A₁^m, ..., A_{k_m}^m) as B_m
               from D (G)
               where p₁^s and ... and p_k^s)
where p₁^t and ... and p_k^t.
```

A mapping defines the relationship between a target 210 relation and a set of source 205 relations using three components, the query graph G, the set V of value correspondences, and two sets of filters, $C_S$ and $C_T$. The query graph G defines how data in the source 205 relations are linked, or "pieced" together to produce all data associations. The set V of value correspondences defines how system 10 can translate the data associations into tuples in the target 210 relation. The two sets of filters, $C_S$ and $C_T$, define the conditions that source 205 and target 210 tuples, respectively, must satisfy. The schema mapping system 10 uses this mapping representation to depict arbitrary combinations of join and outer join queries, allowing system 10 to represent and manipulate a powerful class of mapping queries.

The mapping representations created by the schema mapping system 10 support the incremental development of mapping queries. The concept of mapping examples is critical to the ability of system 10 to use source 205 data to assist users in constructing mappings and in verifying that they are semantically correct.

For a mapping $M=(G, V, C_S, C_T)$, $Q_M$ is the mapping query defined by M. Query $Q_M$ is a query over all data associations of G. For a specific data association $d \in D(G)$, system 10 defines $Q_M(d)$ as the result of the mapping query applied only to $\{d\}$. The mapping $\phi(M)=(G,V, \emptyset, \emptyset)$ (with mapping query $Q_{\phi(M)}$) is the mapping defined by M without any source 205 or target 210 filters. An example e of a mapping $M=(G, V, C_S, C_T)$ is a pair $e=(d, t)$, where $d \in D(G)$, and $t=Q_{\phi(M)}(d)$. Example e is a positive example if $t=Q_M(d)$ (that is, if d satisfies all the conditions in $C_S$, and t satisfies all conditions in $C_T$). Otherwise, e is a negative example.

A positive example demonstrates how a set of source 205 tuples is combined together to contribute towards the target 210 relation. It provides insight into the target 210 tuples that a mapping will produce. A negative example demonstrates either a case where source 205 tuples are combined correctly (using the valid join conditions) but fail to make it into the target 210, or a case where source 205 tuples are combined by a different but plausible join condition. A negative example provides insight into what will be omitted from the target 210 by filter predicates, or by the choice of a particular join condition. An illustration is then any set of examples for a mapping. System 10 is interested only in illustrations that provide a satisfactory showcase of the behavior of a mapping.

An illustration includes a set of data associations. System 10 tags each data association with a field that encodes its coverage and that indicates whether the example it includes is positive or negative. A sufficient illustration is one that demonstrates all aspects of a mapping: the query graph, the filters, and the value correspondence. If I is a set of examples of a mapping $M=(G, V, C_S, C_T)$, then I is a sufficient illustration of mapping M if it is a sufficient illustration of a query graph G, a data correspondence V, and the data trimming filters $C_S$ and $C_T$.

A query graph defines the data associations of a mapping. As discussed previously, the set of all data associations defined by a query graph G can be partitioned according to the coverage of the data associations. Each connected subgraph J defines one component of the partition of D(G,J) called a category. It is possible that some of these categories are empty. To sufficiently illustrate a query graph, an illustration must include at least one example induced by a data association from each category of D(G) that is not empty. If I is a set of examples of a mapping M=(G, V, $C_S$, $C_T$), then I is a sufficient illustration of the query graph G=(N, E) if it satisfies the following property: for each induced, connected subgraph J=($N_J$, $E_J$) of G, if there exists a data association in D(G) whose coverage is $N_J$, then I contains an example (d, t)∈I whose coverage is $N_J$.

Each way of forming a data association in D(G), i.e., each category of D(G), is one component of the mapping. Since there may be many such components, it is important that a user understands correctly the effect that each component has on the resulting mapping. In particular, it is important that for each category the chosen example illustrates the effect of using that and only that category. More precisely, if an example (d, t) illustrates a category induced by a connected subgraph J of the query graph, then there exists a guarantee that the tuple t will appear in the target as a result of running the mapping query applied only on {d}. Moreover, if the component induced by the connected subgraph J is ignored from the mapping, then t will not appear in the target data. System 10 guarantees this, by ensuring that there does not exist some other tuple t' that can subsume t and that may be the result of a different category in the query graph. This is implemented in system 10 by an algorithm that generates queries to retrieve examples.

The definition of a sufficient illustration of a query graph is refined to develop a sufficient illustration of filters. I is a sufficient illustration of the data trimming predicates $C_S$ and $C_T$ if, for each induced, connected subgraph J=($N_J$, $E_J$) of G, the following conditions hold:

if there exists a positive example (d,t) where coverage(d) =$N_J$, then I contains such a positive example; and if there exists a negative example (d,t) where coverage (d)=$N_J$, then I contains such a negative example.

The effect of the filters on a mapping is illustrated from two perspectives. First, system 10 illustrates the data associations with incomplete coverage that are eliminated by the filters; these data associations do not carry enough semantics to be meaningful in the context of the target 210. Second, system 10 illustrates data associations that have enough coverage, but fail to satisfy the filters for other reasons. In this sense, the illustration provides some insight into the effect of filters in removing data associations with invalid values.

System 10 focuses on three salient properties of value correspondences to help users understand the correspondence. First, system 10 must provide enough information that the user can understand how a correspondence transforms data associations. To illustrate this, for each target 210 attribute B system 10 ensures there is an example that creates a tuple with a non-null value on B (if such an example exists). Second, system 10 must help the user understand how complete the mapping is, i.e., whether all the target 210 tuples created will have a non-null value for a particular attribute. Third, system 10 must facilitate the user's understanding of the properties of the source 205 columns that have an impact on the behavior of the value correspondence. For instance, the user should be able to understand how a value correspondence behaves when one or more of its source 205 columns are null.

I is a sufficient illustration of the value correspondences V if for each induced connected subgraph J=($N_J$, $E_J$) of G and for each target 210 attribute B:

if there exists a positive example (d,t), where coverage (d)=$N_J$ and where t[B]≠null, then I contains such an example; and if there exists a positive example (d,t), where coverage (d)=$N_J$ and where t[B]=null, then I contains such and example.

As before, I is a set of examples of a mapping M=(G, V, $C_S$, $C_T$).

Sufficiency is a way of ensuring all aspects of a mapping are illustrated. The system 10 permits a user to select values they understand and use the examples induced by these values. Most likely, a user will be familiar with the manner in which specific data values relate to other data values; therefore, system 10 is designed to take maximum advantage of user knowledge in its illustrations.

Given a mapping, the system 10 is able to build a sufficient illustration that provides an entry point into the data source 205. System 10 makes use of evaluation and optimization techniques for the minimal union operator to efficiently compute D(G) and select a minimal sufficient illustration. From this starting point, a user may select subsets of the illustration or subsets of the original source 205 relations to focus the illustration on specific data of interest.

Several user interface methods help users understand the mapping and its illustration: The difference between positive and negative examples is displayed. For example, positive examples are displayed in black letters, negative examples are displayed in red letters. The relationship of example data in the target table and data in the source tables is displayed. For example, highlighting a row in the target table automatically highlights the corresponding rows in the (possibly multiple) source tables. For negative examples due to filter conditions, the reason for failing the filter condition is shown. For example, the data value that contradicts the filter condition is shown in a different color or font. For examples that combine data from multiple source through join conditions, the attribute values of the join conditions are displayed. This technique illustrates how and why these source tuples were combined to a target tuple. For instance, the attributes are shown in a different font.

The focus relation with scheme $S_f$ is a distinguished relation F∈N, where the focus tuples, f, are a distinguished set of tuples from the relation associated with F. I is then focused on f if, for every data association $$d \in D(G) \text{ where } \Pi_{S_F}(d) \in f \qquad (8)$$

the resulting example (d, t) is in I, where I is a set of examples of a mapping M=(G, V, $C_S$, $C_T$) and G=(N, E). An illustration focuses on f if all data associations involving tuples of f are included in the illustration.

Illustrations help a user understand mappings, understand differences between mappings, and identify shortcomings or flaws in a mapping. System 10 enables a user to act on the knowledge gained through illustrations to extend or refine a mapping by providing to the user a suite of operators for manipulating mapping. These operators permit users to easily and effectively make use of the sophisticated query reasoning and query management knowledge encapsulated within system 10. By nature, the process of creating complex mappings is incremental. System 10 allows the user to easily invoke these operators and quickly discern their results.

After examining an illustration of a mapping, a user may invoke a mapping modification operator which creates a new mapping or set of new alternative mappings. Each new mapping is illustrated by a set of examples that are derived naturally from the current example presented by system 10. A few of the operators provided by system 10 are presented in the following description. The mapping modification operators are grouped by their effect on the mapping. First, correspondence operators permit a user to change the value correspondences. As the user adds new value correspondences to a mapping, system 10 determines a set of alternate mappings and helps the user decide among them using illustrations. Second, data trimming operators modify the source 205 and target 210 filters of a mapping. These operators change the set of source 205 and target 210 tuples included in the mapping rather than the query graph of a mapping. Data trimming operators are illustrated by system 10 using positive and negative examples so a user can see the effect of the different filters.

Additionally, system 10 provides a set of data linking operators, which directly change the query graph of the mapping. Data linking operators allow the user to extend a query graph. Using these operators, a user can incrementally build potentially complex mappings. However, the user does not need to undertake the daunting task of specifying the structure of the new query graph or changes to the current graph. Rather, the user may use data to invoke these operators by indicating what source 205 data is missing from the current illustration.

Two of the data linking operators are the data walk and the data chase. Additional data linking operators are provided by system 10; these two are described to illustrate the approach used by system 10 in data linking. When invoking a data walk, the user knows where the missing data resides in the source 205 or what source 205 relation(s) specifically contain this data. Using this information, system 10 infers possible ways of augmenting the query graph to include the new data and illustrates each new mapping alternative, for example, each alternative joinpath. A data chase is implemented when the user does not know where the missing data resides. The chase permits the user to explore the source 205 data incrementally to locate the desired data by exploiting data values included in the data associations in the current illustration. These values are "chased" through the source database 205 to discover new ways of linking the illustration data with other data values until the desired data is found. For both operators, system 10 provides the complex query management required to create and illustrate the new mapping.

For both the data walk and data chase operators, system 10 may discover many ways to extend the query graph. However, the majority of these can be quickly dismissed by the user as semantically invalid, leaving a few viable alternatives that the user can explore further using other mapping or example operators.

A data walk makes use of the knowledge of the source 205 schema of system 10, which is gathered from schema and constraint definitions and from mining the source 205 data, views, stored queries, and metadata. Using this knowledge, system 10 deduces a set of possible ways of joining relations (different joinpaths) each specified by a query graph. In general, system 10 has knowledge of a (possibly empty) set of potential query graphs for joining any two source 205 relations.

Figure 3:
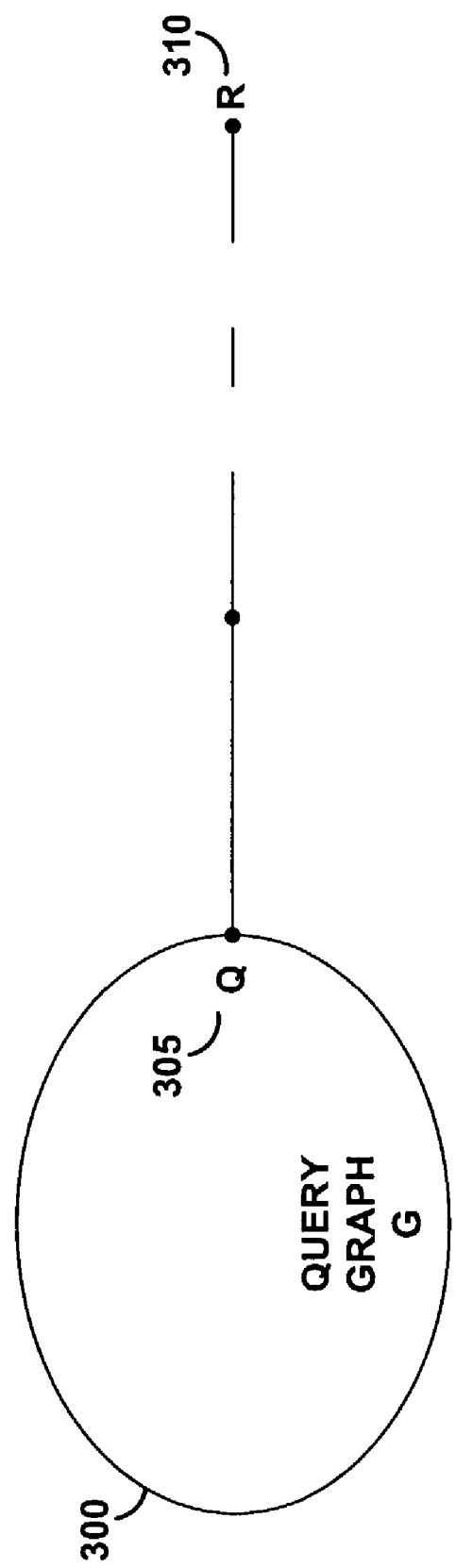
FIG. 3 illustrates an extension of a query graph.

Given a query graph 300 G(N, E) shown in FIG. 3, a walk from node Q 305 of G 300 to a relation name R 310∈N is a path from Q 305 to R 310. There may be many such paths. Formally, walks (G(N, E), Q, R) are the set of all query graphs G'(N', E') conceivable by system 10's inference engine that satisfy the following conditions:

G' is a path between Q 305 and R 310, and
If e∈E' is an edge between two nodes in N, then e∈E and the label on this edge is the same in both G 300 and G'.

If a potential graph violates the second condition above, system 10 introduces a new copy of a relation to create a valid extension.

The data walk operator extends a mapping with data walks. Let M=}G(N, E), V, $C_S$, $C_T$¬ be a mapping. Let Q∈N be the start relation which may be chosen by the user or by system 10. Let R∈N be the end relation. The result of the operator DataWalk(M, Q, R) is a set of new mappings, one for each extension G'∈walks(G, Q, R). Each new mapping is defined as $M_e$=}$G_e$, V, $C_S$, $C_T$> where $G_e$=G∪G'. The union of a graph is defined as the union of the nodes and the union of the edges. Notice that G is an induced, connected subgraph of $G_e$.

The user can also extend the query graph of the mapping by using the data chase operator. The chase is designed for cases the user may not know which relations should be included in the extended query graph. When implementing a data chase, the user selects a source 205 attribute value in the current illustration and asks system 10 to show how this specific value can be used to extend the mapping. In response, system 10 identifies all occurrences of the value within the data source 205. For each occurrence, an extended mapping is formed and illustrated.

Let M=}G, V, $C_S$, $C_T$¬ be a mapping with illustration I. Let v be a value of attribute Q[A] where Q is one of the relations referenced by a node in G and v is in I. For each relation R that is not referenced by a node in M, where v∈R[B], the mapping M is extended to a new mapping chase(M).=<G', V, $C_S$, $C_T$> The new query graph is G'=(N', E') where N'=N∪{R}, e=(Q, R) with label Q[A]=R[B] and E'=E∪{e}.

A data chase provides the user with a set of alternative scenarios for extending the current mapping with one outer equijoin using a selected value. It is up to the user to decide whether each extension is meaningful in the context of the current mapping. Note that chase is not targeted, i.e., the user is not asking for suggestions about how to best extend the mapping to cover a particular relation. Rather, system 10 helps the user in experimenting with new data connections. Usually, the data chase operator is used in combination with data walks to combine the user's understanding of the data with that of system 10.

As a mapping evolves, its illustration must also evolve. System 10 evolves illustrations in such a way that the user is not required to learn a new set of data in order to understand the evolution. The data in the old illustration, which is familiar to the user is retained as much as possible in the new illustration, providing a continuity requirement of illustration evolution.

Instead of selecting a completely new set of examples, a continuous evolution extends each example in the current illustration. If the new illustration is not sufficient, the user may request system 10 to add new examples to preserve sufficiency. Through continuous evolution of mapping, the role of these new examples in understanding the mapping is made clear and the user does not lose his place when existing examples disappear or mutate beyond recognition.

In addition to simple mappings, system 10 is designed to map large amounts of data between complex schemas. Mapping complexity generally falls into three categories. During the mapping process, the user must be able to manage and manipulate multiple mappings while the user explores the data, creates new correspondences and extends the query graph. System 10 provides a transformation framework to support the mapping process. The more complex the relationship between source 205 and target 210, the more mappings system 10 must handle. As a complex transformation is created, system 10 reuses portions of mappings to greatly ease the user's task as the number of mappings needed for a particular target 210 mapping becomes more numerous and complex. Finally, users often contend with large volumes of data that need to be transformed. If the user is unfamiliar with the data source 205, the amount of data itself may be an obstacle to developing a mapping strategy. System 10 helps users deal with both large source schemas 205 and large target schemas 210.

Since each mapping produces a subset of the tuples of a single target 210 mapping, many mappings may need to be created to map an entire target schema 210. Often, these mappings will have a great deal of overlap, differing only in a few correspondences or a small portion of the query graph. Re-creating the bulk of each mapping would be tedious for the user. Fortunately, system 10 stores the decisions made in creating one mapping and makes that decision process available to the user for creation of additional mappings. System 10 initiates such automatic creation of mappings when the user adds a new correspondence, forcing the system to generate an additional mapping to help complete a target 210. System 10 tries to reuse as much of an existing mapping as possible.

Figure 4:
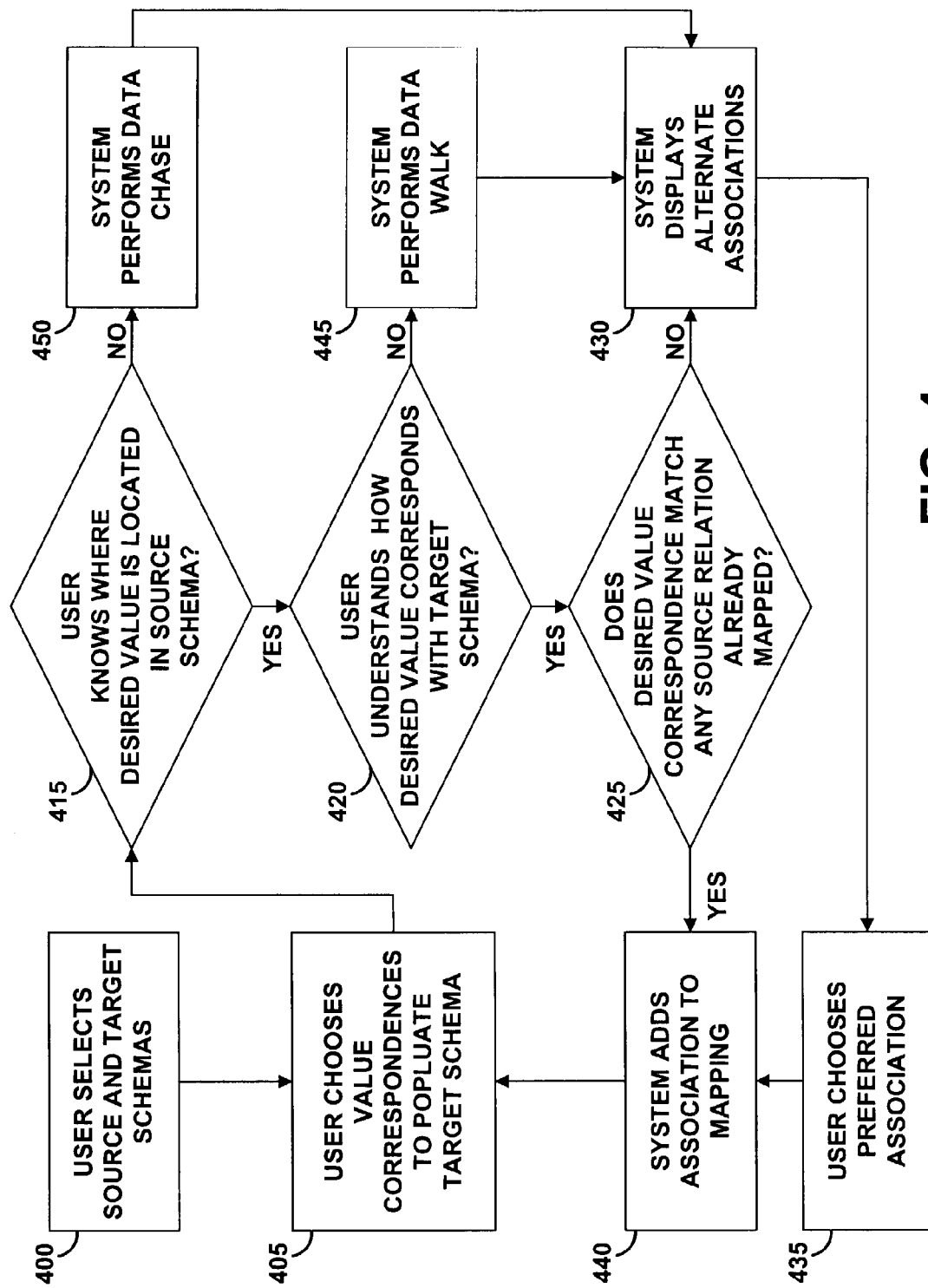
FIG. 4 is a flowchart depicting the performance of the system of the data-driven understanding and refinement of schema mapping system.

The performance of the data-driven understanding and refinement of schema mappings system 10 is further explained through the flowchart of FIG. 4, with further reference to an exemplary source database 205 shown in FIG. 5 and an exemplary target relation 210 shown in FIG. 6c. Assume that the user chooses in step 400 to map the source database 205 "School" shown in FIG. 5 to the target relation 210 "Kids" in FIG. 6c. The source database 205 School includes 6 related files, Children 500, Parents 505, PhoneDir 510, SBPS 515, and XmasBox 520. From schematic information, the user in step 405 indicates a correspondence between either attributes or schema constructs, using value correspondences. As shown in FIG. 6a, the user indicates that Children.ID of Children 500 corresponds to Kids.ID of Kids 210 by edge v1 600 and Children.name corresponds to Kids.name through edge v2 605. System 10 displays a sample of the data from the relevant source 205 table, Children 500, as shown in FIG. 6b along with the result of the current mapping, as shown in FIG. 6c. This allows the user to verify that Children.ID not only looks like Kids.ID at the schema level, but that the values of Children.ID belong in the Kids.ID attribute in the target database 210.

Tuples in a target 210 relation can often be computed in several ways. For instance, tuples in the target 210 relation Kids may be computed differently for children in public school and children who are home schooled. A mapping defines one out of possibly many ways of forming target 210 tuples; the mapping construction include determining correspondences, data linking, and data trimming. When determining correspondences, the user may wish to populate a FamilyIncome field with the sum of a child's parent's salaries from the source 205 Parents.Salary field of Parents 505 in FIG. 5. Using correspondences, System 10 determines how source 205 values should be combined to make up target 210 values. In the example shown in FIG. 6, several value correspondences map values in Children.ID of Children 500 to the target 210 attribute Kids.ID including a simple identity function, $v_{id}$: Children.ID→Kids.ID. Other correspondences might use several source 205 relations or even several copies of the same source 205 relation. To populate the target 210 attribute Kids.FamilyIncome, system 10 could use the value correspondence $v_{sal}$: Parents.Salary+Parents2.Salary→Kids.FamilyIncome.

In step 410 of FIG. 4, the user next indicates that the Parents.affiliation of Parents 505 should map to Kids.affiliation (edge v3 610 of FIG. 6a). The user in step 415 knows where the desired value is located in the source 205 schema and in step 420 understands how the desired value corresponds with the target schema. Since Kids.affiliation in FIG. 6c corresponds to a different relation than the rest of the Kids 210 data already mapped, it is not clear in step 425 which affiliation value should go with which kid tuple. System 10 is aware of two foreign keys in the source database 205 of FIG. 5, mid and fid of Children 500, both referencing Parents.ID of Parents 505. In step 430, system 10 shows the user these two ways of associating children with affiliations in the source database 205 as illustrated in FIG. 7. FIG. 7 shows two scenarios with the Children 500's tuple for Maya and the parent affiliation highlighted in the source database 205 School and the resulting mapping to the target database 210 Kids highlighted. Because the user is familiar with the data in the source database 205, she quickly realizes that mid and fid of Children 500 are mother ID and father ID, respectively. The user selects the scenario with the desired target 210 semantics in step 435 and system 10 adds this association to the target 210 schema in step 440. In this example, the user identifies Scenario 1, where children are associated with their father's affiliations.

Data linking is used to determine first which parent tuples belong with a child. FIG. 8 shows three different query graphs; each one represents one way of linking tuples for the source database 205 of FIG. 5, that is, one for each joinpath. For graph G 800, PhoneDir 510 and Parents 505 tuples are associated if they have common ID values. Similarly, Parents 505 and Children 500 tuples are associated if Parents.ID=Children.mid. The node set {Children, Parents2} induces graph $G_1$ 805, a connected subgraph of G 800. Tuple t 900 in FIG. 9 is a full data association of $G_1$ 805, as seen by referring to FIG. 5. The node set {Children, Parents2, PhoneDir} also induces a connected subgraph, $G_2$ 810, shown in FIG. 8. System 10 can pad t 900 with nulls to form a possible data association u 905 of $G_2$ 810. The new association u 905 is not a full data association of $G_2$ 810 since it does not involve a tuple of PhoneDir 510. Tuple v 910 is a full data association of $G_2$ 810, as seen by referring to FIG. 5.

In addition, if $R_1$ is the set of full data associations of $G_1$ 805 and $R_2$ is the set of full data associations of $G_2$ 810 then $R_1$=Children $\neg_{mid=ID}$ Parents and $R_2$=Children$\neg_{mid=ID}$ Parents $\neg_{ID=ID}$ PhoneDir. As a result, $R_1 \oplus + R_2 = R_2$. It is easy to verify that all tuples in $R_1$, after being padded with attributes of PhoneDir 510, are strictly subsumed by tuples in $R_2$. This would not be true if some parents had no phone numbers in the data source 205 of FIG. 5.

The set of all induced, connected subgraphs of G 800 from FIG. 8 is the set of subgraphs induced by the following sets of nodes: {C}, {P}, {Ph}, {S}, {C, P}, {C, S}, {P, Ph}, {C, P, Ph}, {C, P, S}, and {C, P, Ph, S}. The set of all data associations of G, D(G), can be computed as follows (where $p_1$, $p_2$, and $p_3$ are all the predicates "C.mid=P.ID", "C.ID=S.ID", and P.ID=Ph.ID", respectively):

$$D(G) = C \oplus P \oplus Ph \oplus S \oplus (C\urcorner_{p_1}P) \oplus (C\urcorner_{p_2}S) \oplus (P\urcorner_{p_3}Ph) \oplus (C\urcorner_{p_1}P\urcorner_{p_3}Ph) \oplus (C\urcorner_{p_1}P\urcorner_{p_2}S) \oplus (C\urcorner_{p_1}P\urcorner_{p_2}S\urcorner_{p_3}Ph) \quad (9)$$

FIG. 10 shows the tuples in D(G). Each data association is tagged with its coverage. Due to space constraints, Children.docid and SBPS.location attributes are not shown since these are not used in the mapping. However, these attributes are part of the data association.

Data trimming determines which of the joined source 205 tuples should be used in forming a target 210 tuple. For example, the user may not want all children 500 to appear in the target database 210, only those under the age of seven. Similarly, a user may not wish to see information about a person's income in the target 210 unless that income is associated with a child. For instance, Row 7 1000 of FIG. 10 contains information that is not related to any children 500, and thus may not be useful for the target 210 relation Kids.

In creating a mapping for the Kids target 210 relation, the user may wish to exclude all target 210 tuples that have a null Kids.ID. The user may indicate this by specifying a not-null constraint in the target schema 210. In the mapping, system 10 represents this using a target 210 predicate over the target 210 relation Kids: Kids.ID<> null. Alternatively, the user may indicate that unless a data association involves Children 500, it is not of interest. This choice can be represented by the following source 205 predicate:

$$\wedge(C.ID=null \wedge C.name=null \wedge C.age=null \wedge C.mid=null \wedge C.fid=null \wedge C.docid=null) \quad (10)$$

A simpler predicate may be used if one or more attributes of Children 500 are constrained to be non-null. Note that these two predicates on Kids 210 and Children 500 are not necessarily equivalent. Finally, a user may also specify constraints on source 205 or target 210 values. The following examples constrain the FamilyIncome attribute of the target 210 to be under $100,000 and the source 205 attribute Age of Children 500 to be under 7:

Kids.FamilyIncome<$100,000
Chidren.Age<7.

Value correspondences, query graphs, and selection predicates are combined to build a representation of a mapping. Each mapping represents one alternative joinpath. Based on the query graph G 800 of FIG. 8, V={v1, v2, v3, v4, v5} are value correspondences for Kids.ID, Kids.name, Kids.affiliation, Kids.contactPh, and Kids.BusSchedule, respectively, of the target database 210 shown in FIG. 6. Identity functions v1, v2, v3, and v5 are defined on attributes C.ID, C.an., P.affiliation, and S.time, respectively. The function concat, v4, is defined on attributes Ph.type and Ph.number, with the following signature:

concat: String × String → String.
The function concat produces a new string s
by concatenating its first parameter, ":",
and its second parameter. For $C_S$ = {"C.age < 7"}
and $C_T$ = {"Kids.ID ≠ null"}, {G, V, $C_S$, $C_T$} is
a mapping. The query defined by this mapping is
the following:
    select *
    from ( select C.ID as ID, Cname as name,
        P.affiliation as affiliation,
        concat(Ph.type, Ph.number) as contact Ph,
        S.time as BusSchedule
        from D(G)
        where C.age < 7
    where ID ≠ null A sufficient illustration is one that demonstrates all aspects of a mapping. FIG. 11 shows a sufficient illustration of the query graph G 800 of FIG. 8. Notice that the query graph remains sufficient if one of the examples with coverage row 1100 CPPhS is removed. However, if the example with coverage row 1105 PPh is removed, this illustration is no longer sufficient in regard to the G 800 since it does not illustrate data associations with coverage row 1105 PPh. Also, notice that there are no parents in the database who have children and no phone. Therefore, there exists no data association with coverage CP. For similar reasons, there is no example with coverage C or CPS.

As discussed earlier, examples are chosen such that they faithfully illustrate the effect that each component of the mapping has. For example, the component CPPh is illustrated in FIG. 11 by three source tuples in tables Children, Parents and PhoneDir, representing information about "Kyle". Although not shown in the figure, to complete the illustration for CPPh, the target tuple t is added, that would result by applying this component of the mapping to the set of three tuples mentioned before:

t={ID:001, name: Kyle, affiliation: Xerox, contactPh:
    201-0001, BusSchedule: null, FamilyIncome:
    null}.

The example is chosen so that no other component of the mapping (such as CPPhS etc.) can produce a similar output target tuple (possibly with more information). For example, it is guaranteed that "Kyle" has no Bus Schedule entry in the database. Otherwise, a more informative tuple would have been produced by a different component of the mapping (CPPhS) and t would not make it to the target. In contrast, "Maya" is chosen as an illustration for the component CPPhS because it is an example of a child that has a Bus Schedule entry. System 10 has a query generation algorithm that is able to efficiently and correctly retrieve examples that illustrate one and exactly one component of the mapping. As an example, the SQL query used to produce examples to illustrate CPPh is the following:

(Select C.ID as ID, C.name as name, P.affiliation as
    affiliation,
        Ph.number as contactPh
    From Children C, Parents P, PhoneDir Ph
    Where C.mid = P.ID and P.ID = Ph.ID
EXCEPT
    Select C.ID as ID, C.name as name, P.affiliation as
        affiliation,
        Ph.number as contactPh
    From Children C, Parents P, PhoneDir Ph, SBPS S
    Where C.mid = P.ID and P.ID = Ph.ID and C.ID = s.ID)
JOIN
(Select C.ID as ID, C.name as name, P.affiliation as affiliation,
    Ph.number as contactPh,
    null as BusSchedule, null as FamilyIncome,
    C.ID, C.name, C.age, C.mid,
    P.ID, P.affiliation
    Ph.ID, Ph.number
    From Children C, Parents P, PhoneDir Ph
    Where C.mid = P.ID and P.ID = Ph.ID)

The first part of the query checks that the only tuples that are retrieved are generated by the first SELECT FROM WHERE block (CPPh component of the mapping) and are not subsumed by any tuple generated by the second SELECT FROM WHERE block (CPPhS component of the mapping). The result is then joined with the third SELECT FROM WHERE block (in effect CPPh again). In addition to the values used for the target attributes, all the source columns are retrieved as well by this join. Each tuple in the result of the above query can be used as a correct, sufficient illustration for the CPPh component of the mapping.

To increase efficiency, system 10 issues these queries against an initially generated sample database. This sample database has the same schema as the original source database 200, but each table in the sample database contains only a fixed number of randomly chosen tuples of database 205. If the SQL query finds as many examples as needed in the sample database, these example tuples are used. If not, the query is issued against the original database 205 to find all possible example tuples. The tuples that are chosen to be shown to the user as examples are then inserted into the sample database, so that the next time a query is issued against the sample database, there will be a sufficient number of examples therein.

An illustration is focused on f if all data associations involving tuples of f are included in the illustration. The illustration shown in FIG. 11 is focused on Children 500, with Children 500 tuples with ID values 001, 002, 004, and 009 as the focus tuples 1100. All data associations from FIG. 10 that involve these children are included in the illustration. This illustration is not focused on the Parents 505 tuple identified by ID 205 since the data association shown in row 3 1005 of FIG. 10 involving parent 505 with ID 205 is not included in this illustration. This illustration does not provide a complete picture of the behavior of parent 505 with ID 205 under the mapping. However, this illustration allows the user to learn everything about the children mentioned.

Figure 12B:
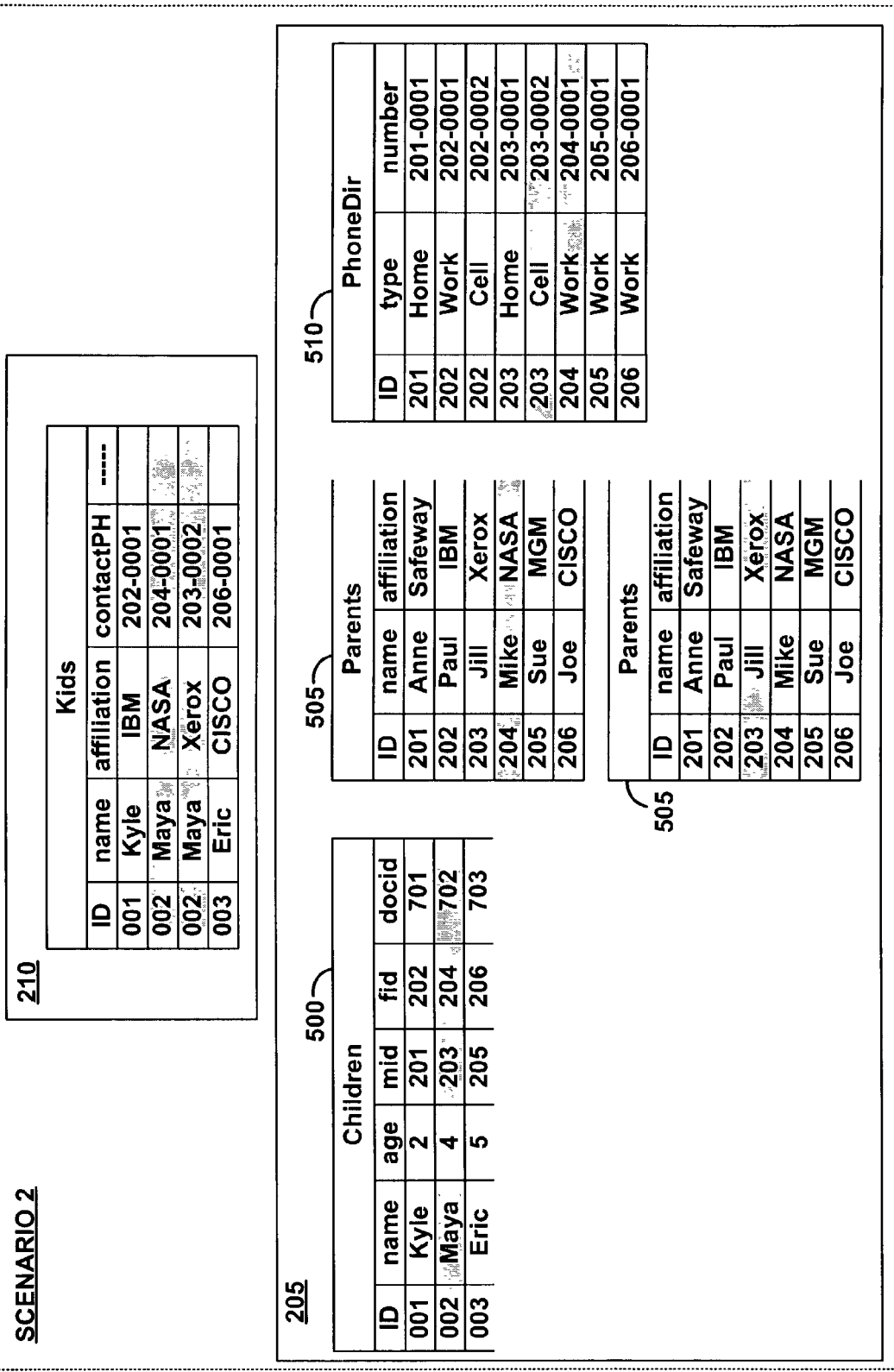
FIG. 12 is comprised of FIGS. 12A and 12B, and illustrates two possible scenarios for associating the children and phone numbers of the exemplary source database of FIG. 5.

Returning to the flow chart of FIG. 4, the user next decides to populate Kids.contactPh of Kids 210 with source 205 data (step 410). The user notices that phone numbers in the source 205 all appear in the PhoneDir 510 relation in step 415, but is unsure in step 420 how to associate phone numbers with Kids 210. The user requests system 10 to perform a data walk in step 445 to find associations between children and phone numbers. In response, system 10 produces several scenarios in step 430, two of which are shown in FIG. 12. Scenario 1 of FIG. 12a associates children with their father's phone numbers and scenario 2 of FIG. 12b with their mother's phone numbers. To illustrate the second alternative, system introduces a second copy of the Parents 505 relation to indicate that children are being associated with values in two parent tuples. The user is able to view and manipulate the illustrations, asking for different example tuples to gain sufficient understanding of the alternatives, allowing the user to select the most appropriate mapping. For this example, the user chooses the Scenario 2 in FIG. 12b and adds a correspondence from PhoneDir.number to Kids.contactPh as represented by the edge v4 615 of FIG. 6a.

Figure 13A:
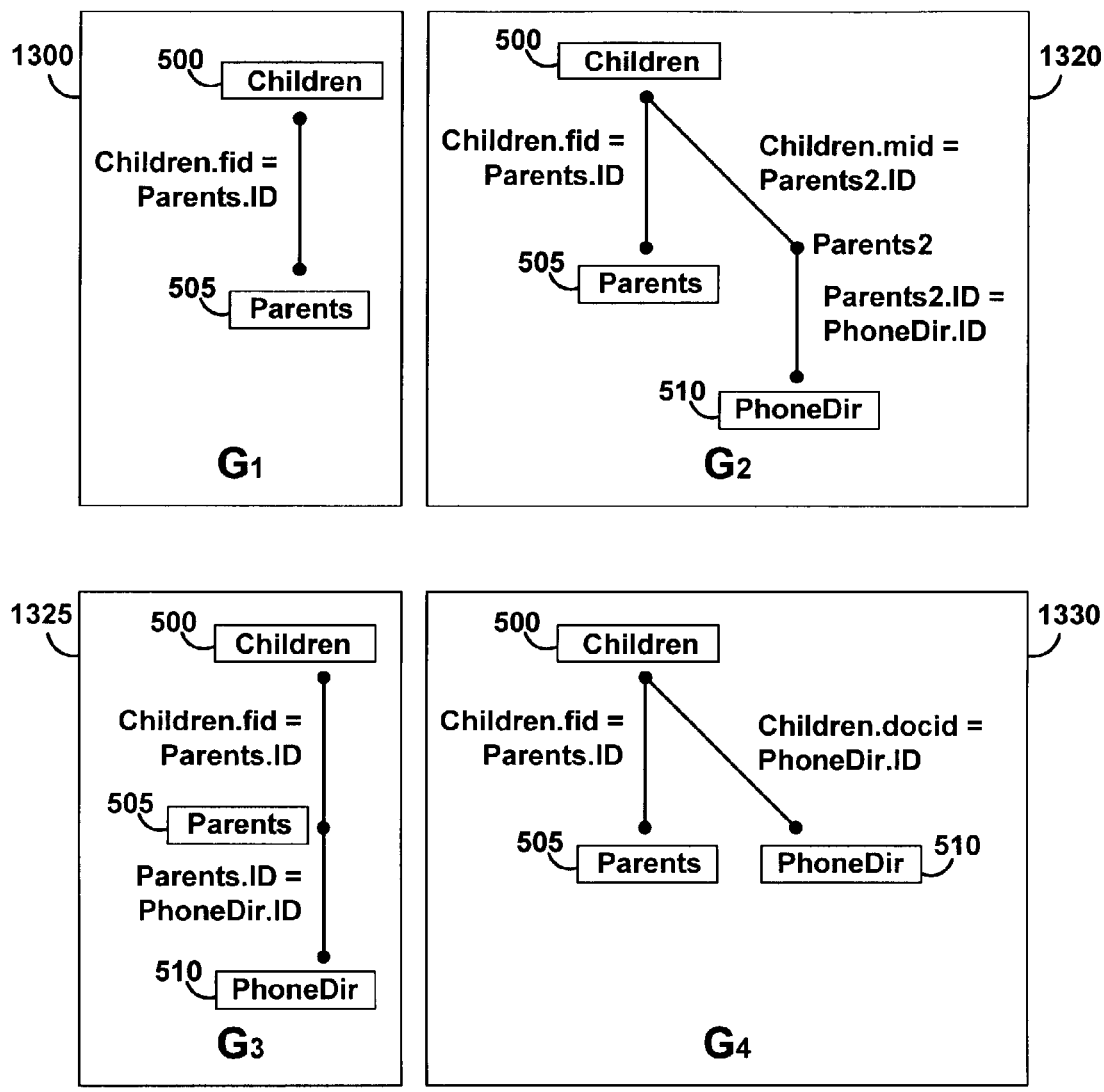
FIG. 13 is comprised of FIGS. 13A and 13B, and shows the query graphs generated by a data walk through the exemplary source database of FIG. 5.
Figure 13B:
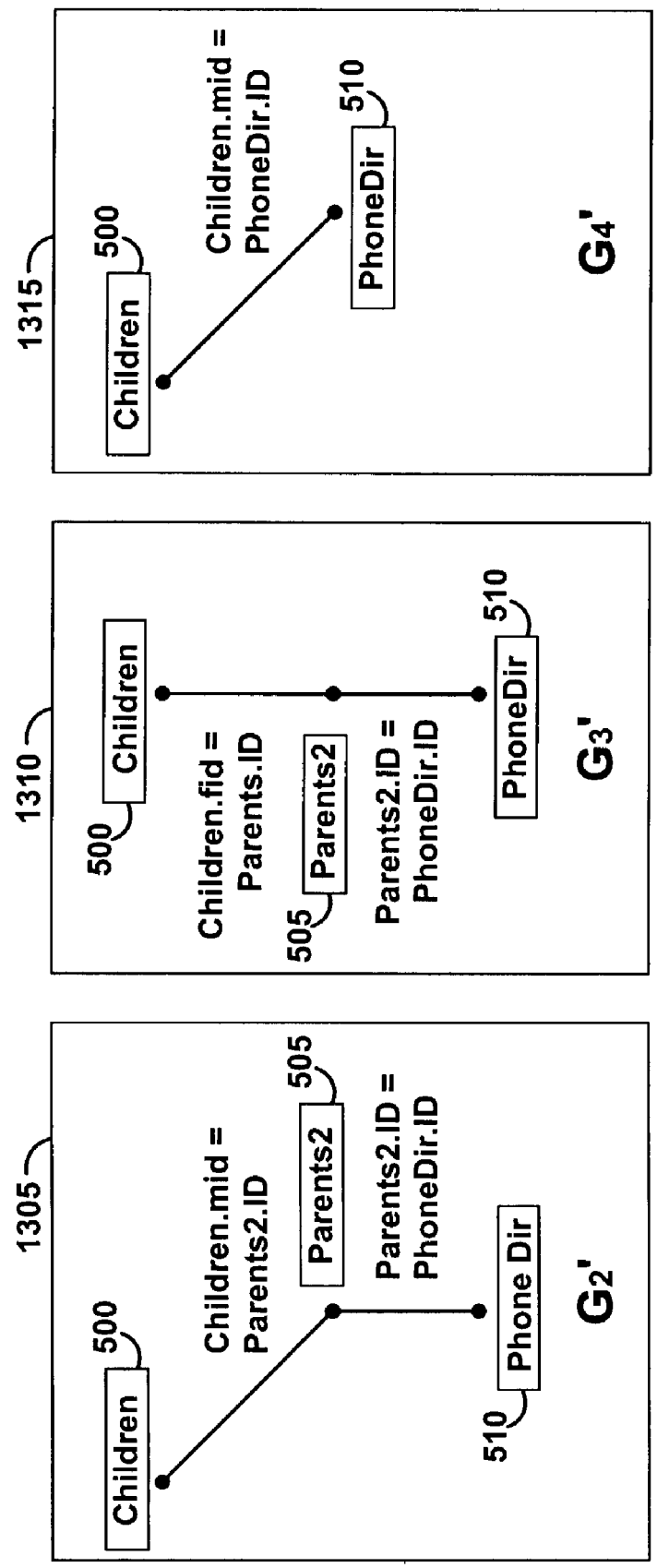

Based on the example database of FIG. 5, the user wishes to add phone numbers to the Kids 210 database of FIG. 6 and the basic query graph $G_1$ 1300 of FIG. 13a. The possible query graphs meeting the conditions for a data walk are $G_2'$ 1305, $G_3'$ 1310, and $G_4'$ 1315, as shown in FIG. 13b. In response to the data walk request, system 10 produces for the user a set of alternative query graphs, depicted as query graphs $G_2$ 1320, $G_3$ 1325 and $G_4$ 1330 in FIG. 13a. The graph $G_2$ 1320 is obtained by merging $G_1$ 1300 and $G_2'$ 1305, $G_3$ 1325 is obtained by merging $G_1$ 1300 and $G_3'$ 1310, and $G_4$ 1330 is obtained by merging $G_1$ 1300 and $G4'$ 1315. Each graph represents a different way of associating children with phone numbers, i.e., different joins.

Each graph of FIG. 13a is the basis for a mapping and an illustration of that mapping. Suppose the user likes the mapping associated with query graph $G_2$ 1320, but notices that in cases where mid is null (child has no mother), there is no contact Ph in the target 210. The user might accept that mapping while adding the filter "mid not null". However, the result is that motherless children disappear from the target 210. Realizing that when there is no mother, the father's phone should be used, the user also accepts the mapping associated with query graph $G_3$ 1325, adding the filter "mid is null".

Figure 15:
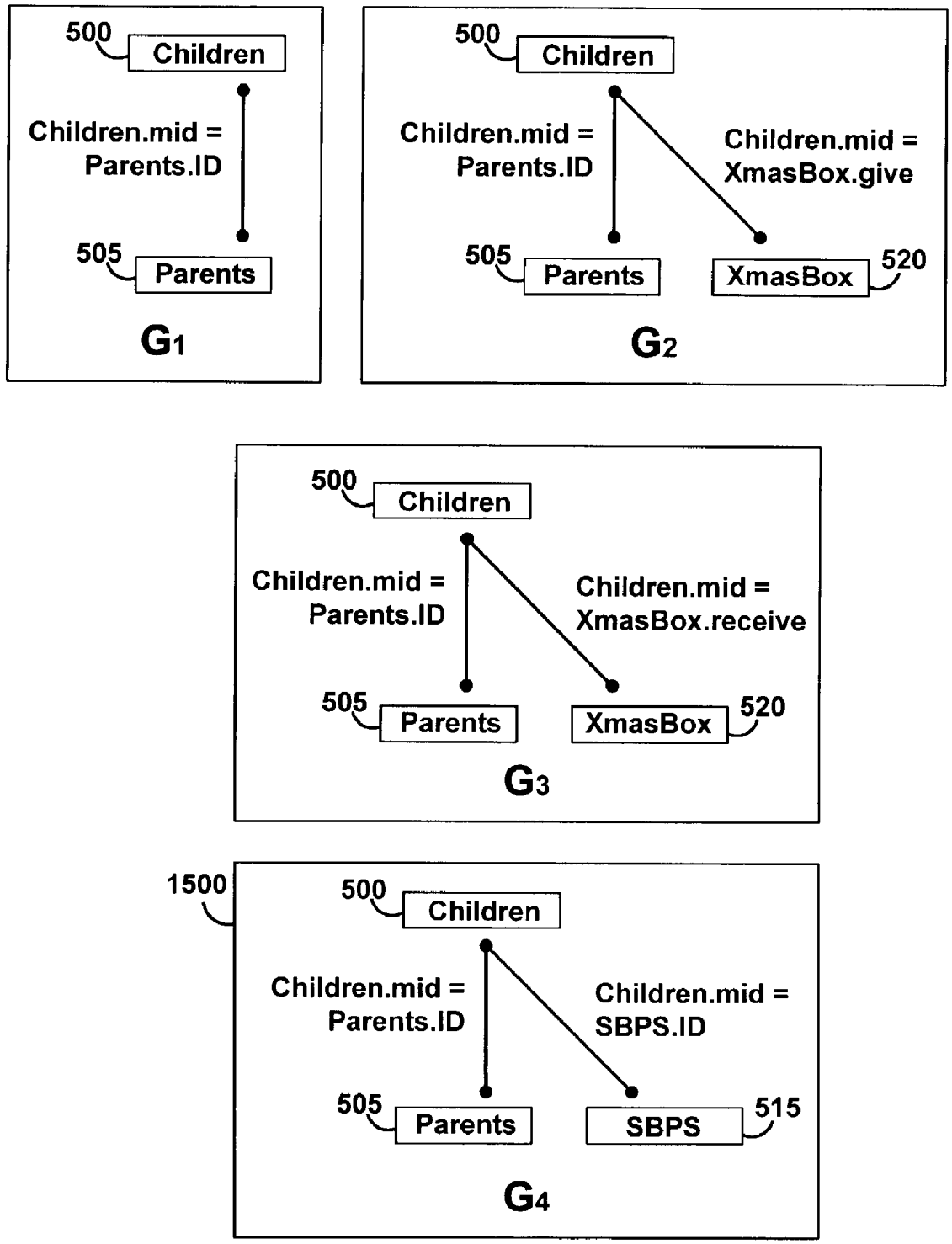
FIG. 15 shows the query graphs generated by a data chase through the exemplary source database of FIG. 5.

Returning to the flow chart of FIG. 4, the user now wishes to populate Kids.BusSchedule in the target database 210 (step 410). From the source database 205, it is not obvious where to find this data (step 415), unless the user knows that the cryptic name SBPS stands for "School Bus Pickup Schedule". The user may not have enough knowledge of the source 205 to request a data walk to a specific relation (step 420). However, the user guesses that any tuple that records the school bus schedule of a child might carry the ID of the child. The user chooses an ID value, for example Maya's ID, 002, and asks system 10 to chase this value in step 450. System 10 locates all occurrences of this value in other relations, finding that 002 appears in one attribute of SBPS and in two attributes of XmasBox. Using the "Maya" example, system 10 displays the results as three scenarios in step 430, shown in FIG. 14 with the appearances of ID 002 highlighted. FIG. 15 illustrates possible query graphs followed by system 10 in this data chase. After reviewing the relevant data, the user selects in step 435 scenario 1 of FIG. 14 (corresponding to graph $G_4$ 1500 of FIG. 15) as the correct association of school bus schedules with children, adding a correspondence v5 620 from SBPS.time to Kids.BusSchedule as shown in FIG. 6a. System 10 then adds this association to the target schema in step 440.

During the mapping process, system 10 maintains and manipulates a mapping between the source database 205 and target database 210 and uses this mapping to generate examples. System 10 uses input from the user along with sophisticated query and constraint reasoning to derive this mapping. System 10 also uses target 210 constraints provided as part of the schema or input by the user as part of mapping creation. For example, a target 210 constraint may indicate that every Kid 210 tuple must have an ID value. From this constraint, system 10 knows not to include SBPS 515 or Parent 505 values in the target 210 if they are not associated with a Children 500 tuple. Using this constraint plus the user choices made in the example of FIGS. 4 through 15, system 10 derives the following mapping:

create view Kids as
    select C.ID as ID, Can. as name, P.affiliation as affiliation,
       D.number as contactPH, S.time as BusSchedule
    from Children C
    left join Parents P on C.fid=P.ID
    left join Parents P2 on C.mid–P2.ID
    left join PhoneDir D on C.ID=D.ID
    left join SBPS S on D.ID=S.ID
    where C.ID is not null;

Notice that system 10 uses left outer joins extensively to make sure that even children without affiliation, contactPh, or BusSchedule are extracted from the source database 205. By showing the result of the mapping as well as sample source 205 data, system 10 allows the user to fine-tune this mapping. For example, if the user is interested only in children who do have a bus schedule, the user can indicate that BusSchedule is a required field. System 10 would then change this left outer join to an inner join.

Figure 16:
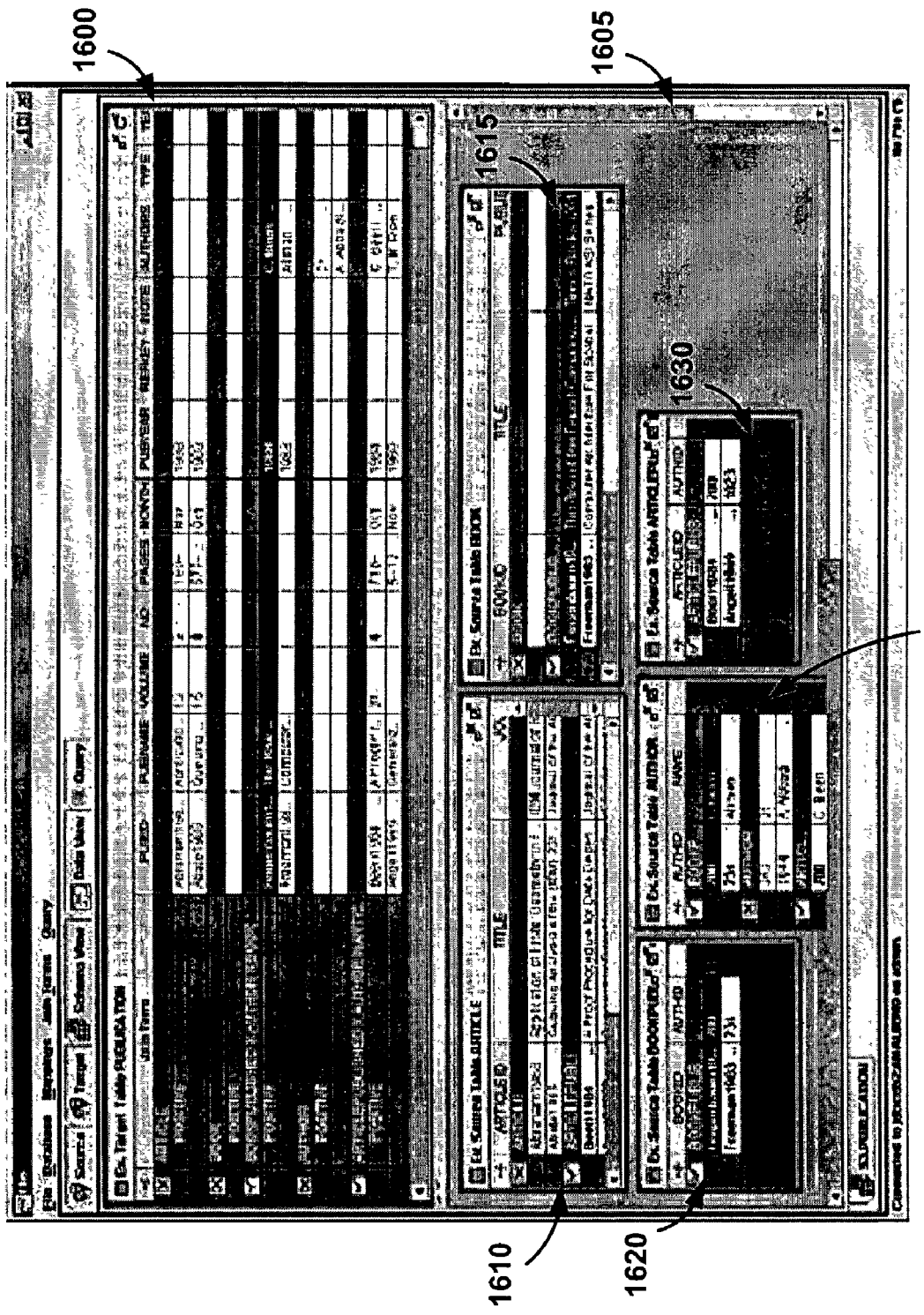
FIG. 16 shows the display screen for mapping the values of a source schema to a target schema using the system of FIG. 1.

The schema mapping system provides users with a target table viewer 1600, a source table viewer 1605, displaying all source relation 1610 through 1630 participating in the mapping, as shown in FIG. 16. The target viewer 1600 shows the examples of contents of target schema 210 as positive examples, as they would be under the "current mapping". The target viewer 1600 also shows negative examples as they would be under other mappings using different joinpaths. Finally, the target viewer 1600 shows negative examples as they would be if filter conditions would be missing.

The source table viewer 1605 shows examples of contents of source schema 200. It shows a set of examples for each source table. These examples correspond to the examples shown in the target table viewer 1600. An example shown in the target table viewer combines data values from at least one source table. Highlighting an example therein automatically highlights the corresponding examples in the source table viewer. Thus it is visualized where data values come from and how they are combined.

The source table viewer also serves as a palette from which users can choose the relations with which they want to work or explicitly select a data value to follow. Following a data value is one way to request a data walk. As the user works with these examples, modifying the query graph, the examples displayed change. The associated mapping also changes, and these changes are reflected both in the source table viewer 1605, and in the target viewer 1600. When a data walk or data chase results in several alternative mappings, new examples are created to represent those alternatives. One of the new examples is chosen by system 10 as the new positive example representing the "current mapping", and the other examples are changed to be negative.

When multiple mappings are possible, system 10 orders them from most likely to least likely, using simple heuristics related to path length, least perturbation to the current active mapping, etc. The user can rotate through mappings or explicitly select a examples as positive in order to test the effects of different mappings.

System 10 ensures that the active mapping and the mapping examples 1610 through 1630 in the active workspace 1605 are all synchronized. Changes to any of them are automatically reflected in the others. In addition, the positive examples displayed in the target viewer 1600 are always the data produced by the current mapping. Consequently, users are able to explore the source data and its linkages through both the data and the schema at the same time, seamlessly. Further, and perhaps more importantly, system 10 helps the user understand the results of the mappings being formed and allows the user to verify that the transformations that result are what was intended.

The system 10 shows one or more example-tuples per mapping, as described previously. The displayed tuples are selected from a set of tuples obtained through a query to the source 205 database. In addition to these tuples, an extension to system 10 can be provided that shows the size of the tuple set as an integer number. This number appears in a separate column. There is one such number for each type of example for each mapping, i.e., there is one such number for the standard example tuples of each jointerm, and one such number for the set of filtered out tuples, and one such number for each set of tuples representing a different joinpath.

By seeing the amount of data that an example exemplifies, the user is able to gauge the effect and necessity of including/excluding certain mappings. For example, if an example-tuple represents a set of only 2 or 3 tuples, it is likely that these tuples are exceptions and should not be included in a mapping. However, if the example represents a significant portion of the available data, a user might want to include this data in the mapping (if it is not already included). Metaphorically speaking, knowing tuple set sizes gives users a better feeling for the data and the mapping.

The tuple set sizes for each jointerm and each example can be found by simply executing a query. From the result of this query, the system 10 chooses one or more example tuples. System 10 counts the number of tuples in this result and displays this number. System 10 describes the use of sample databases to increase performance of the system. Thus, the query result size will only reflect the portion of the sample database. System 10 multiplies this number with the inverse of the sampling ratio to find an approximation of the true number reflecting the portion of the original database. As an alternative, an efficient query can be constructed against the original database that only returns the number of tuples and not the entire result tuple set It is to be understood that the specific embodiments of the invention that have been described are merely illustrative of certain application of the principle of the present invention. Numerous modifications may be made to the data-driven understanding and refinement of schema mappings invention described herein without departing from the spirit and scope of the present invention. Moreover, while the present invention is described for illustration purpose only in relation to mapping data from one database to another, it should be clear that the invention is applicable as well to any collection of data or databases accessible either through an internet or intranet connection.

What is claimed is:

1. A method for visually mapping a schema from at least one source schema to a target schema, comprising:
creating a mapping of data from the at least one source schema to the target schema;
selectively extracting data examples from the at least one source schema;
visually displaying the data examples to a user for assisting the user in selecting a revised mapping based on the visually displayed, extracted data examples;
the user selecting at least one of the extracted data examples;
automatically selecting the revised mapping based on the at least one of the extracted data examples;
automatically generating a query corresponding to the selected revised mapping;
wherein selectively extracting data examples comprises extracting positive and negative examples;
selectively switching between the positive and negative examples; and
wherein the positive example is said data move to the target schema and the negative example is said data not move to the target schema.

2. The method of claim 1, wherein the user selecting at least one of the extracted data examples comprises the user selectively rejecting at least some of the data examples.

3. The method of claim 2, wherein selectively extracting data examples comprises extracting only representative data examples.

4. The method of claim 1, further comprising the user selecting data values for displayed data examples.

5. The method of claim 4, further comprising the user chasing the data values by finding the same data values in a database.

6. The method of claim 4, further comprising the user walking the data values by following predefined paths through a database.

7. The method of claim 1, wherein creating the mapping from the at least one source schema to the target schema comprises defining each mapping as a union of joint terms, with each joint term mapping different parts of the data.

8. The method of claim 7, wherein displaying the data examples comprises displaying at least one data example per joint term.

9. The method of claim 1, wherein displaying the data examples comprises displaying the mapping at a schema level.

10. The method of claim 1, wherein displaying the data examples comprises displaying the mapping at a data level.

11. The method of claim 1, wherein creating the mapping of data comprises determining locations at which source data values appear in the target schema.

12. The method of claim 11, wherein creating the mapping of data further comprises determining how source tuples from different relations should be combined to form a target tuple.

13. The method of claim 12, wherein creating the mapping of data further comprises determining which source tuples should be used in forming the target tuple.

14. A computer program product having instruction codes stored on readable storage medium, for visually mapping a schema from at least one source schema to a target schema, comprising:
a first set of instructions for creating a mapping of data from the at least one source schema to the target schema;
a second set of instructions selectively extracting data examples from the at least one source schema;
a third set of instructions for visually displaying the data examples to a user for assisting the user in selecting a revised mapping based on the visually displayed, extracted data examples;
the user selecting at least one of the extracted data examples;
the third set of instruction codes automatically selecting the revised mapping based on the at least one of the extracted data examples;
a fourth set of instructions for automatically generating a query corresponding to the selected revised mapping;
wherein the data examples comprise positive and negative data examples;
wherein the third set of instructions allows the user to selectively switch between the positive and negative data examples; and
wherein the positive example is said data move to the target schema and the negative example is said data not move to the target schema.

15. The computer program product of claim 14, wherein the third set of instructions allows the user to selectively reject the data examples.

16. The computer program product of claim 15, wherein the data examples comprise only representative data examples.

17. A system for visually mapping a schema from at least one source schema to a target schema, comprising:
a schema mapping system creating a mapping of data from the at least one source schema to the target schema;
a processor selectively extracting data examples from the at least one source schema;
a display for visually displaying the data examples to a user to assist the user in selecting a revised mapping based on the visually displayed, extracted data examples;
the user selecting at least one of the extracted data examples;
the schema mapping system automatically selecting the revised mapping based on the at least one of the extracted data examples;
the schema mapping system automatically generating a query corresponding to the selected revised mapping;
wherein the data examples comprise positive and negative data examples;
wherein the display allows the user to selectively switch between the positive and negative data examples; and
wherein the positive example is said data move to the target schema and the negative example is said data not move to the target schema.

18. The system of claim 17, wherein the display allows the user to selectively reject the data examples.

19. The system of claim 18, wherein the data examples comprise only representative data examples.

* * * * *